US 8,255,815 B2

(12) United States Patent
Ording

(10) Patent No.: US 8,255,815 B2
(45) Date of Patent: Aug. 28, 2012

(54) MOTION PICTURE PREVIEW ICONS

(75) Inventor: Bas Ording, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 11/462,696

(22) Filed: Aug. 4, 2006

(65) Prior Publication Data

US 2008/0034306 A1    Feb. 7, 2008

(51) Int. Cl.
*G06F 3/00* (2006.01)
*G06F 9/00* (2006.01)
*G06F 17/00* (2006.01)
(52) U.S. Cl. .................. 715/764; 715/810; 715/838
(58) Field of Classification Search .................. 715/810, 715/764
See application file for complete search history.

(56) References Cited

U.S. PATENT DOCUMENTS

| | | | |
|---|---|---|---|
| 5,404,316 A * | 4/1995 | Klingler et al. ............... 715/723 |
| 5,680,619 A | 10/1997 | Gudmundson et al. |
| 5,790,114 A | 8/1998 | Geaghan et al. |
| 6,166,736 A | 12/2000 | Hugh |
| 6,295,062 B1 | 9/2001 | Tada et al. |
| 6,851,091 B1 | 2/2005 | Honda et al. |
| 6,874,126 B1 | 3/2005 | Lapidous |
| 7,043,477 B2 * | 5/2006 | Mercer et al. ...................... 707/7 |
| 7,159,175 B2 | 1/2007 | Ishii et al. |
| 7,346,850 B2 | 3/2008 | Swartz et al. |
| 7,360,152 B2 * | 4/2008 | Capps et al. .................. 715/201 |
| 7,386,784 B2 | 6/2008 | Capps et al. |
| 2002/0082730 A1 | 6/2002 | Capps et al. |
| 2003/0090504 A1 * | 5/2003 | Brook et al. .................. 345/716 |
| 2005/0165843 A1 | 7/2005 | Capps et al. |
| 2005/0166136 A1 | 7/2005 | Capps et al. |
| 2007/0065044 A1 * | 3/2007 | Park et al. ..................... 382/305 |
| 2008/0034325 A1 | 2/2008 | Ording |

OTHER PUBLICATIONS

Blinkx.tv "http://www.technovelgy.com/ct/Science-Fiction-News.asp?NewsNum=470" Oct. 3, 2005 pp. 1-2.*
Murmurs.com, "REM Last Show, Last Encore," Nov. 22, 2008, http://www.murmurs.com/vblist?page=1& s=ca18a4737dddf05e98ecbdbfe66e5725 A browser window (A1, A2) showing a video clip sourced from a third-party web site that can be activated in the present web page or the clip's home page.
YouTube, "R.E.M. Encore from Mexico City," Nov. 21, 2008, http://www.youtube.com/watch?v=UF5AxcGCkW4&feature=channel_page The Source video / home page (A3) for the video clip of Cite No. 7, above.
ESPN.com, "Lakers Rally to Beat Blazers, 100-86," Jan. 4, 2009, http://scores.espn.go.com/nba/recap?gameId=290104013 A browser window (B1-B3) showing a video clip in a web page.
Portions of prosecution history of U.S. Appl. No. 11/462,695, Mar. 30, 2010, Ording, Bas.
Updated portions of prosecution history of U.S. Appl. No. 11/462,695, Jan. 10, 2011, Ording, Bas.
Updated portions of prosecution history of U.S. Appl. No. 11/462,695, Jul. 7, 2011, Ording, Bas. Updated portions of prosecution history of U.S. Appl. No. 11/462,695, Apr. 11, 2011, Ording, Bas.

* cited by examiner

*Primary Examiner* — Boris Pesin
*Assistant Examiner* — Sabrina Greene
(74) *Attorney, Agent, or Firm* — Adeli & Tollen LLP

(57) ABSTRACT

Some embodiments of the invention provide a method that presents a preview of a set of images in a graphical user interface (GUI) of a device. The method presents a GUI element to represent the set of images in the GUI, where the GUI element is moveable within the GUI. The method then displays within said GUI element a sequence of the images in the set of images to provide a preview of the set of images.

47 Claims, 30 Drawing Sheets

MOTION PICTURE PREVIEW ICONS

CROSS REFERENCE TO RELATED APPLICATIONS

The present application is related to U.S. patent application Ser. No. 11/462,695, concurrently filed with the present application, with the title "Multi-Point Representation".

FIELD OF THE INVENTION

The invention relates to motion picture preview icons.

BACKGROUND OF THE INVENTION

In recent years, there has been a proliferation of multi-media content. One example of such content is motion picture content. Motion picture content is content that includes numerous pictures (frames, fields, images, drawings, etc.) that are displayed in a sequence in order to provide the illusion to a viewer that objects in the picture appear to move. Examples of such content include animations, movies, television shows, home videos, or any other type of video clips.

With the proliferation of multi-media content on computers, various methods have been proposed to allow computer users to identify and organize such content. However, to date, few solutions have been proposed to allow a user to ascertain quickly the subject matter of motion-picture content stored on a computer.

For instance, the graphical user interface of most computers today display a generic icon for the motion picture content and require the user to identify the content's subject matter from the title of the icon. FIG. 1 illustrates one such approach. Specifically, it illustrates four icons 105-120 of four video clips that are stored in a folder 125 entitled Videos. Each of these icons has a text component and a graphical component. The graphical component of each icon only illustrates that the icon's associated video clip is an AVI file that can be opened by the Quicktime media player. An icon's graphical component provides no other indication of the subject matter of the icon's video clip. The only indication of the subject matter of the icon's video clip is provided by the icon's text, which provides the name of the video clip. Hence, a viewer cannot glean too much information about the subject matter of a video clip from the video clip's icon.

Some have suggested having one frame from the video clip serve as the graphical component of the clip's icon. FIG. 2 illustrates one such approach. In particular, it illustrates four icons 205-220 of four video clips that are stored in a folder 225 entitled Videos. The graphical component of each of these icons illustrates the first frame in each video clip, while the icon's text provides the name of the video clip. This approach pictorially provides a user with more information regarding the subject matter of each clip than the approach illustrated in FIG. 1. However, even under the approach illustrated in FIG. 2, a viewer still might not be able to glean too much information about the subject matter of a video clip from the video clip's icon, because the first frame of the clip might not be very representative of the clip's subject matter or might not provide enough information to allow a viewer to understand the subject matter.

Another approach is to display a video preview window next to a video clip's icon when the video clip is selected. The user can then view the video clip in this preview window. FIG. 3 illustrates this approach. Specifically, it illustrates a Movies folder 305 that includes eight video clips. In this figure, the Movies folder is illustrated in a column-view format employed by the OS X operating system of Apple Computer, Inc. Also, in this figure, a video clip 310, entitled Comedy, has been selected. This selection causes a preview window 315 to open to the right of this video clip. At its bottom, the window 315 has control buttons 320 (e.g., play, volume, etc.) that allow a user to initiate and control the playback of the video clip within the window 315.

The approach illustrated in FIG. 3 allows a user to review the subject matter of a video clip without the need to have a media player formally open the video-clip's file. Hence, a user can more quickly ascertain the subject matter of a video clip. On the other hand, this approach still does not provide the user with immediate or near immediate visual data regarding the subject matter of the video clip.

Therefore, there is a need in the art for a graphical user interface that provides quick feedback to a user about the subject matter of a video presentation. More generally, there is a need for a graphical user interface that would provide the same preview feedback for any other audio presentation, image presentation (e.g., collection of images), document presentation, etc. Ideally, this graphical user interface would provide the user with several different options to quickly discern and access the subject matter of the presentation.

SUMMARY OF THE INVENTION

Some embodiments of the invention provide a method that presents a preview of a set of images in a graphical user interface (GUI) of a device. The set of images can be a video presentation, a set of digital photographs, an animation, a set of drawings, etc. To generate the preview, the method initially selects a subset of images that includes several images in the set but not all the images in the set. In some embodiments, the method selects the subset of images in an automated manner. For instance, in some embodiments, the method automatically selects the images based on a specified set of criteria, such as specified intervals in the set of images, scene changes in the set of images, etc. Some embodiments allow a user to adjust the set of criteria (e.g., allow a user to adjust the specified intervals for selecting images in the set of images). In addition, some embodiments allow a user to select the images in the selected subset of images.

After selecting the subset of images, the method concurrently displays the images in the selected subset as the preview of the set of images. In some embodiments, the displayed images are thumbnail versions of the images in the selected subset of images. Some embodiments display all the thumbnail images in the same size in one row or one column. Other embodiments display at least two different thumbnail images in at least two different sizes. For instance, in some embodiments, the thumbnail for at least one image is larger than the thumbnail for at least two other images, and the two smaller images are aligned in one row or one column that is adjacent to the larger thumbnail. Some embodiments define the order of the thumbnail images in the concurrent display of images based on the order of the images in the set of images. In this manner, the order of the images in the display is indicative of the order of the images in the content.

Some embodiments concurrently display the selected subset of images when a user selects, in the GUI, an icon that represents the set of images. Other embodiments have the subset of images form the graphical component of the icon that represents the set of images. In other words, these embodiments display the selected image subset as at least a portion of the graphical component of the icon representing the set of images. Some embodiments display the selected image subset in at least a portion of another GUI element (e.g., a button or other user-selectable GUI element).

Such an icon or GUI element can be part of the GUI of an operating system of the device (e.g., of a computer or other electronic device). For instance, the icon can be displayed in a folder structure of the operating system. Alternatively, the operating system can display the icon in a window that displays the results of a search performed by a user. The icon can also be part of the GUI of an application program (e.g., an image or video editing application) that is executing on the device. The GUI element can be part of the GUI of the operating system of the device or any application executing on the device.

Each multi-image representation provides a static multi-image preview of a set of images. In some embodiments, each such multi-image representation can also provide a dynamic motion-picture preview. Specifically, some embodiments display the set of images in a sequence (1) within the graphical component of the set's associated icon, or (2) within the display window that opens adjacent to the icon to display the subset of images when the icon is selected.

Moreover, when a user requests such a dynamic motion-picture preview, some embodiments provide a motion-picture transition from the static multi-image preview within a multi-image icon to a dynamic motion-picture preview within the multi-image icon. For instance, in some embodiments, all but one of the images in the displayed image subset gradually disappear behind the remaining image. In these embodiments, the graphical window that contains the remaining image then sequentially displays the images in the set. The motion-picture preview icons were described above in the context of multi-image icons and previews. However, some embodiments implement the motion-picture preview in icons that are represented by only a single image (e.g., a single thumbnail image).

In some embodiments, the sequential display of images is in response to a user's request to view a motion picture preview of the images. In response to this request, some embodiments direct an application (e.g., a media player) to retrieve the images and generate the sequential display (e.g., the video display) of the image. Some embodiments have the application perform this operation without a visual indication to the user that the application has been opened.

Some embodiments provide playback control buttons (e.g., play button, stop button, enlarge button, etc.) to facilitate the playing of the sequential display. Such buttons can be part of or associated with (1) the icon that represents the image set, or (2) the displayed image subset when the subset is displayed adjacent to the icon. Some embodiments present some or all of these buttons only when a cursor of the GUI is within a particular distance of the icon or the displayed image subset. Alternatively, in some embodiments, some or all of the buttons are displayed irrespective of the position of the cursor (e.g., some of the buttons are at all times displayed with the icon).

Some embodiments also provide a line that scrolls across a window that displays the sequence of images as the images are being sequentially displayed in a motion-picture icon. This line provides a visual indication of the location of a currently displayed image in the series of the images that are being sequentially displayed. In some embodiments, a user can select and move this line in order to change the image that is being displayed in the window.

BRIEF DESCRIPTION OF THE DRAWINGS

The novel features of the invention are set forth in the appended claims. However, for purpose of explanation, several embodiments are set forth in the following figures.

DETAILED DESCRIPTION OF THE INVENTION

In the following description, numerous details are set forth for the purpose of explanation. However, one of ordinary skill in the art will realize that the invention may be practiced without the use of these specific details. In other instances, well-known structures and devices are shown in block diagram form in order not to obscure the description of the invention with unnecessary detail.

I. OVERVIEW OF SOME EMBODIMENTS

Some embodiments of the invention provide a method that presents a preview of a set of images in a graphical user interface (GUI) of a device. The set of images can be a video presentation, a set of digital photographs, an animation, a set of drawings, etc. Also, in some embodiments, the device is a standalone computer, such as a desktop, laptop, handheld computer, etc. In other embodiments, the device is any type of electronic device that has embedded computing resources, such as processors with firmware or software, or configurable computing resources (e.g., FPGA's), etc. Examples of such devices include consumer electronic or communication devices, home media centers/hubs, handheld electronic devices, etc.

To generate the preview, the method initially selects a subset of images that includes several, but not all, the images in the set. In some embodiments, the method selects the subset of images in an automated manner. For instance, in some embodiments, the method automatically selects the images based on a specified set of criteria. Some embodiments utilize numerical or statistical criteria, such as specifying numerical or percentage intervals in the set of images. Other embodiments utilize criteria based on the content of the images in the set. For instance, some embodiments select images in a video by identifying scene changes in the video and selecting images that occur before or after the scene changes. Some embodiments allow a user to adjust the set of selection criteria (e.g., allow a user to adjust the specified intervals for selecting images in the set of images), while other embodiments do not. In addition, some embodiments allow a user to select the images in the selected subset of images.

Figure 1:
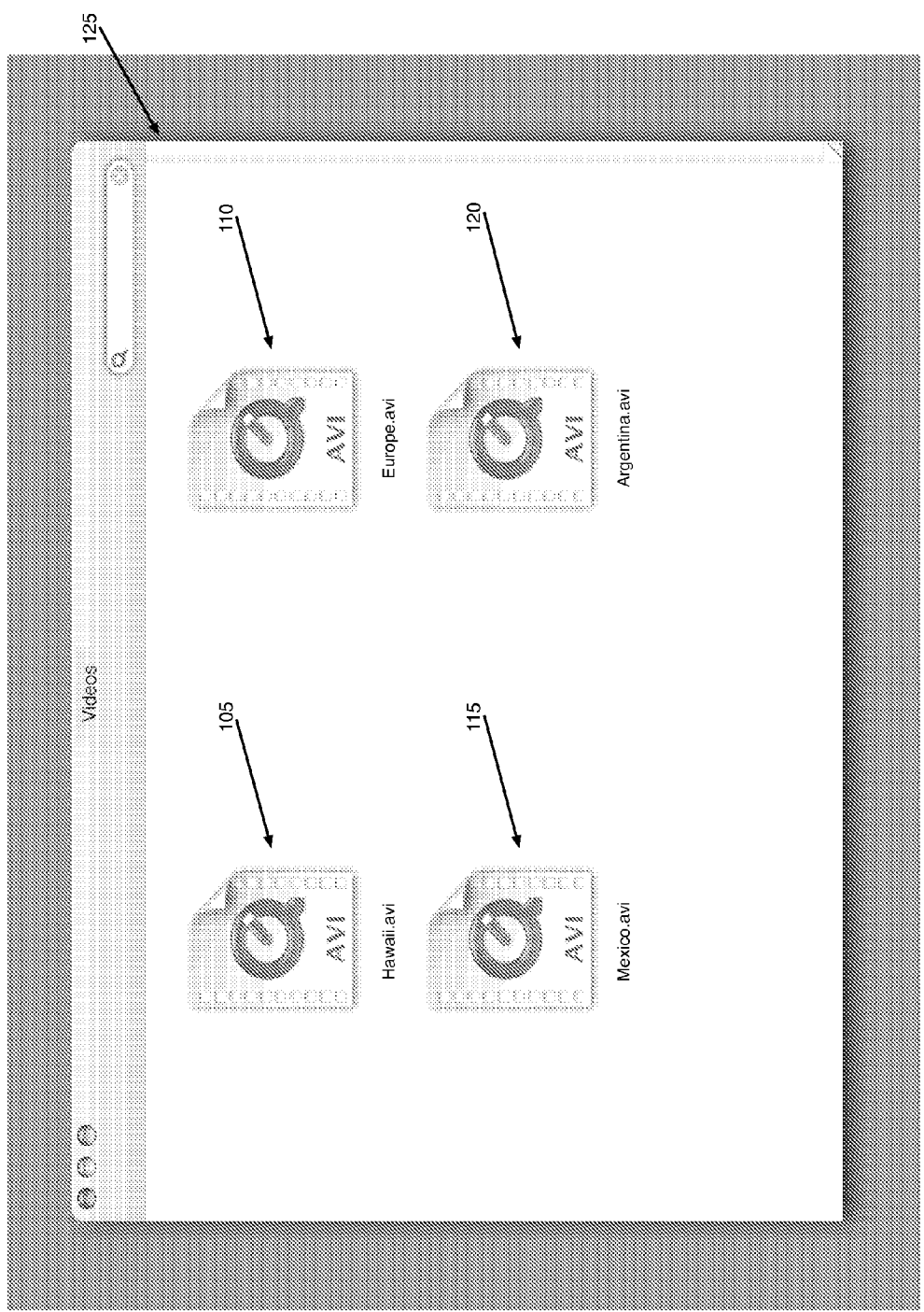
FIG. 1 illustrates generic icons.
Figure 2:
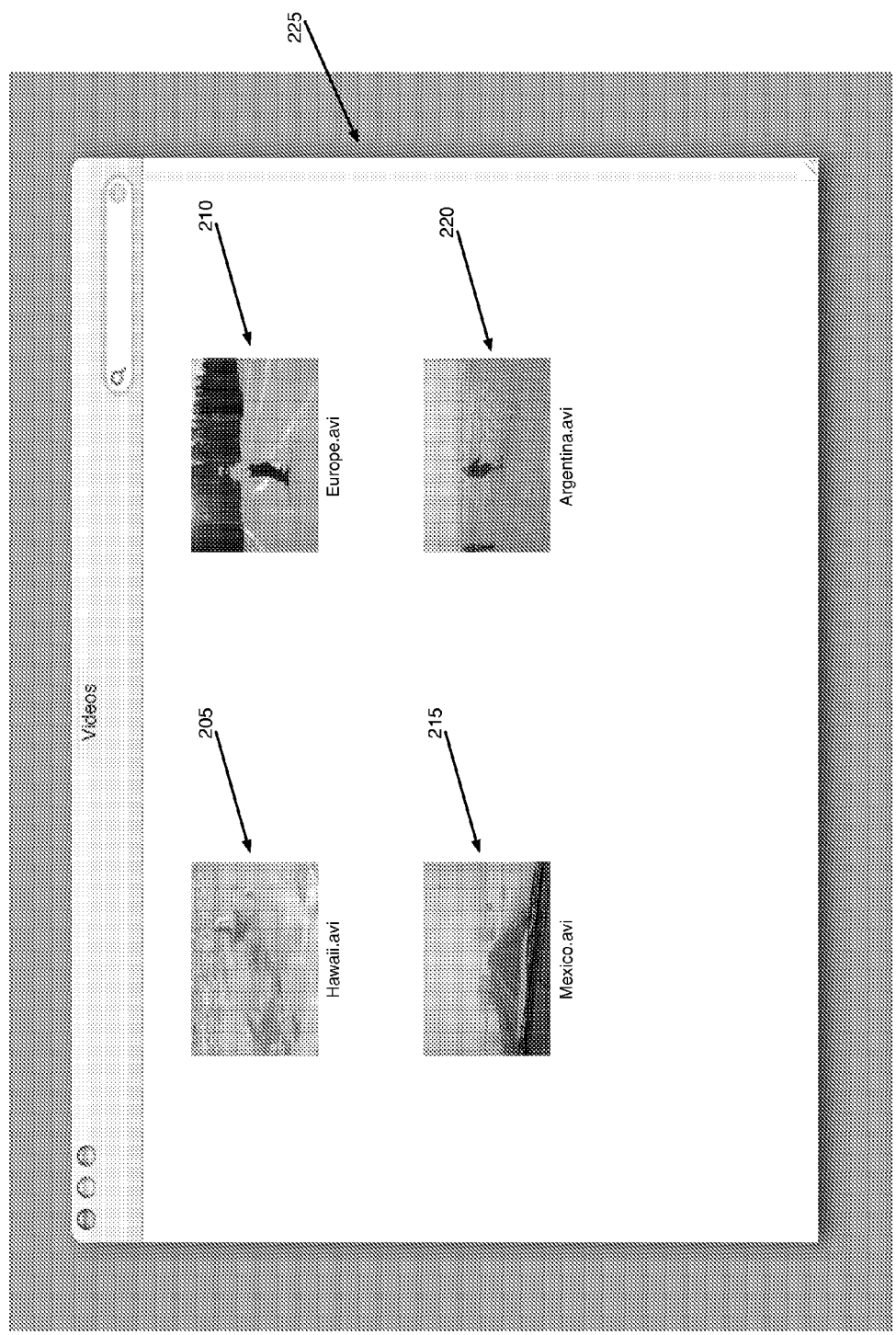
FIG. 2 illustrates icons having one frame from the video clip serve as the graphical component of the clip's icon.
Figure 3:
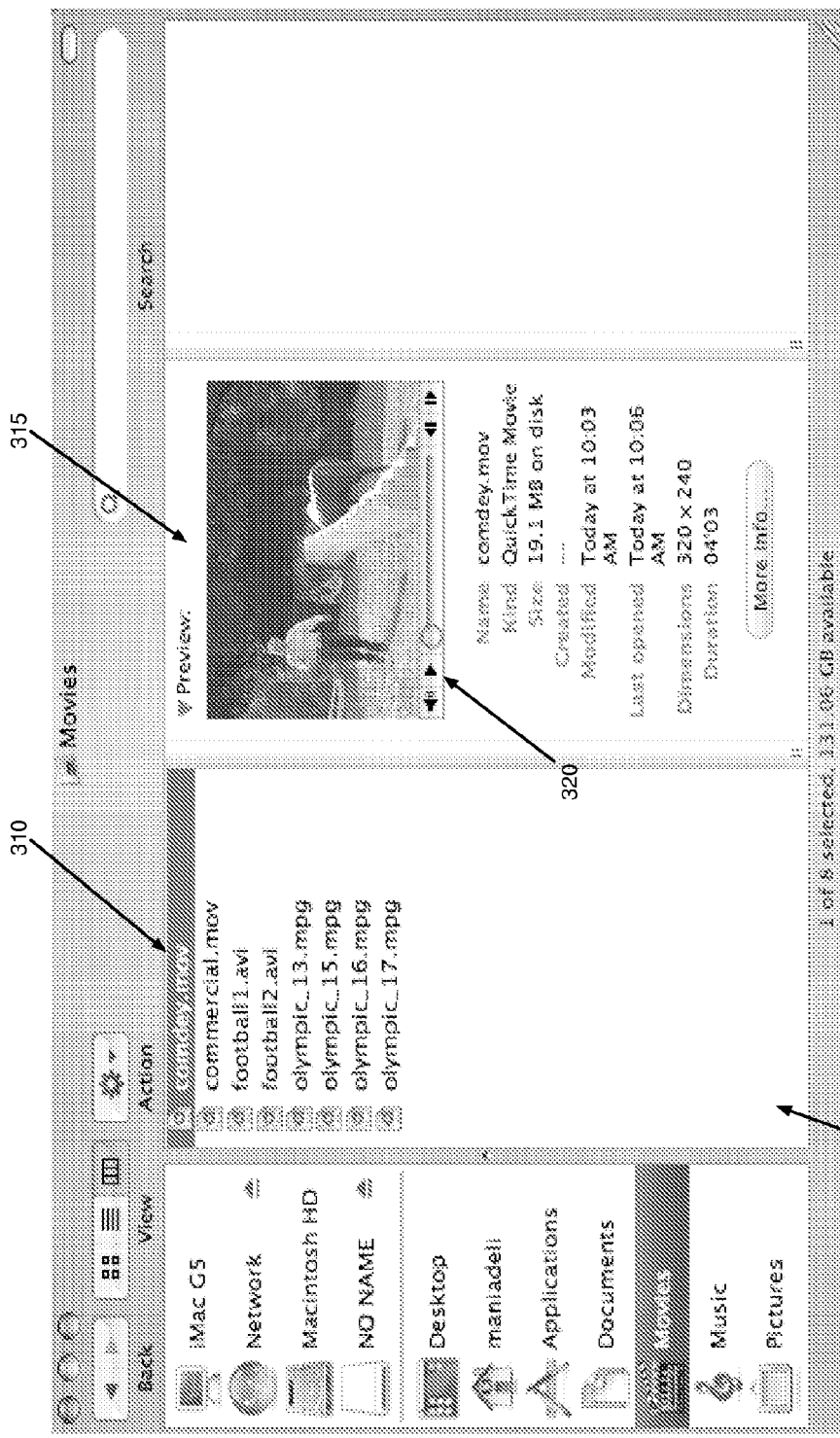
FIG. 3 illustrate a video preview window next to a video clip's icon of some embodiments of the invention.
Figure 4:
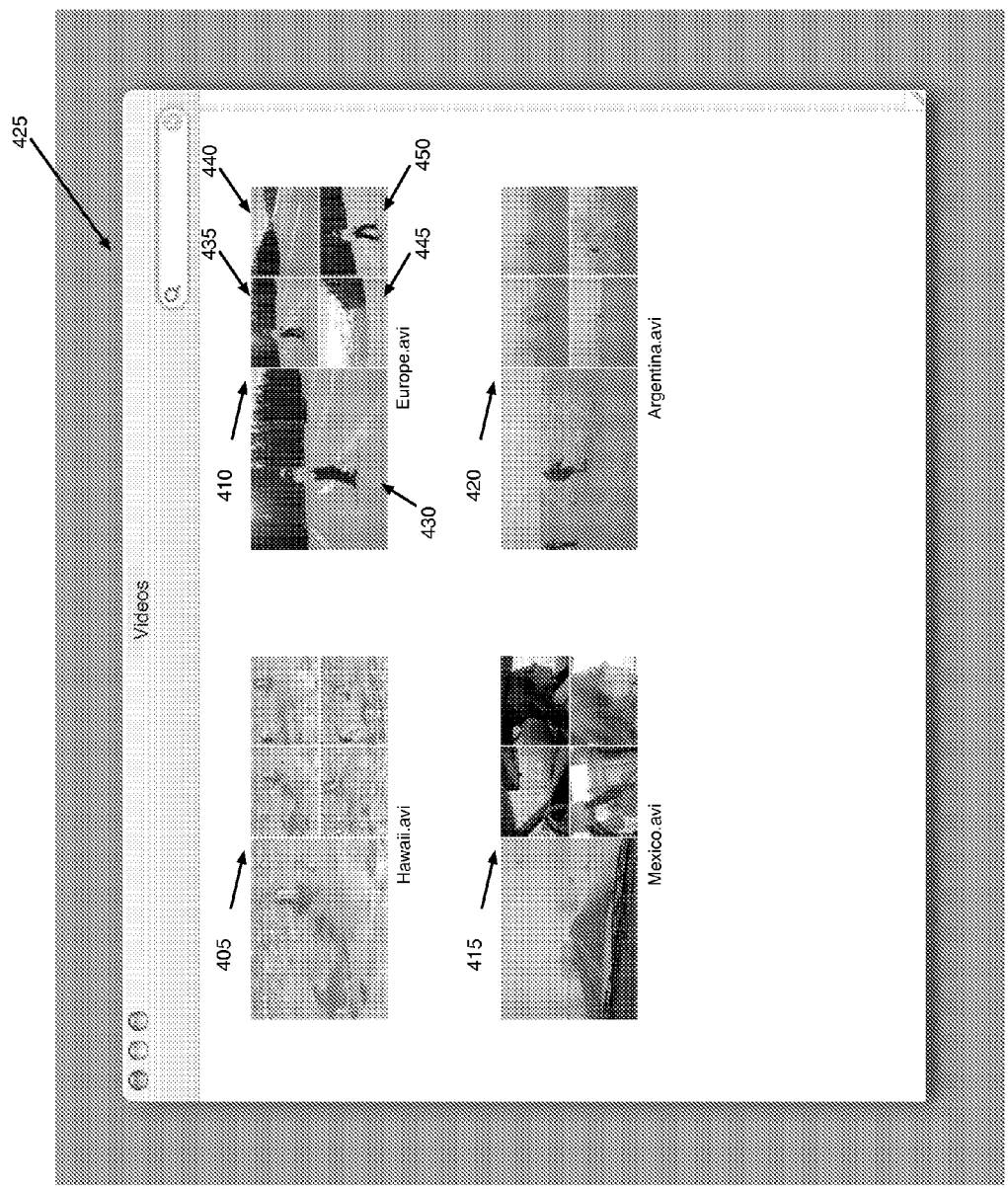
FIG. 4 illustrates multi image icons of some embodiments of the invention.

After selecting the subset of images, the method concurrently displays the images in the selected subset as the preview of the set of images. In some embodiments, the displayed images are thumbnail versions of the images in the selected subset. FIG. 4 illustrates an example of such a display. Specifically, it illustrates four icons 405-420 of four video presentations that are stored in a folder 425 entitled Videos. Each icon has a text component that provides the name of the video presentation associated with the icon.

Each icon also has a graphical component that illustrates five images of five frames in the video presentation. In the embodiment illustrated in FIG. 4, the first image 430 is larger than the other four images. Also, the four smaller images 435-450 are arranged in two rows that are to the right of the larger image. However, as further described below, other embodiments arrange the images differently, have other images appear larger, use the same size for all the images, and/or allow a user to select the arrangement or size of the images.

In each icon 405-420, the order of the images is based on the order of the images in the icon's corresponding video. In this manner, the order of the displayed images is indicative of the order of the images in the video. The combination of an icon's displayed images and the order for their display provides a user with immediate information about the subject matter of the video presentation associated with the icon. Hence, by simply viewing a video's icon in FIG. 4, a user can immediately obtain information about the subject matter of the video.

FIG. 4 provides just one example of some embodiments of the invention. Many other embodiments exist. For instance, multi-image icons can be used (1) by the GUI's of application programs (e.g., image and video editing applications) to display multi-image content being organized, stored and/or edited by these programs, (2) by operating systems or applications to display results of searches, etc. Moreover, as further described below in Section IV, some embodiments use the multi-image representation of a multi-image content not in the content's associated icon but rather in a preview window that opens when a user selects the icon. These alternative embodiments are further described in Sections III and IV. The multi-image preview is also shown in other GUI elements (such as buttons, other user-selectable GUI elements, etc.).

Figure 5:
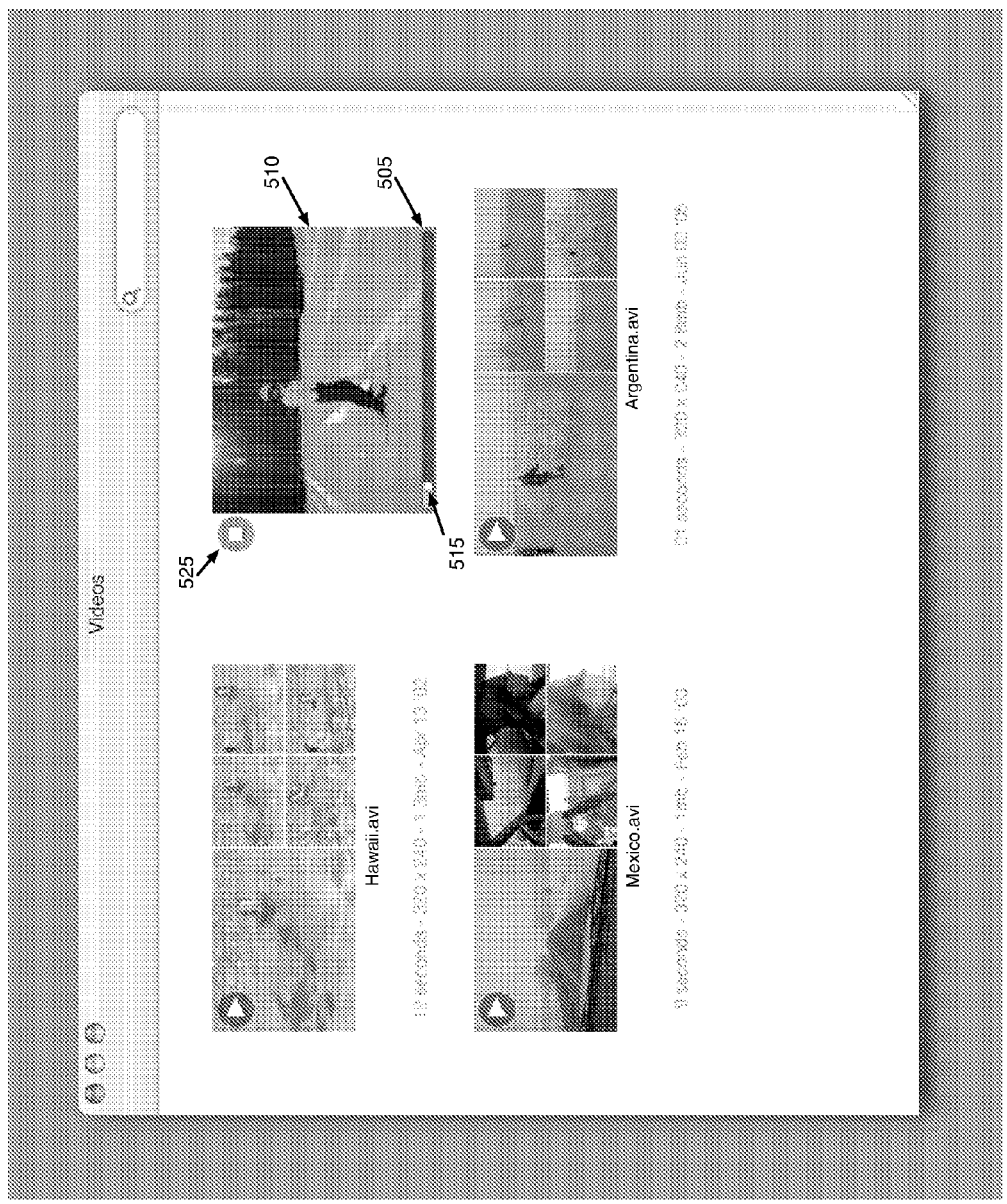
FIG. 5 illustrate a video preview window as part of the graphical component of an icon of some embodiments of the invention.

Some embodiments provide a motion picture preview window as part of the graphical component of an icon that represents an image set, such as a video presentation. This window allows a user to view a preview of the image set within the graphical component of the set's icon. FIG. 5 illustrates one such approach. Specifically, it illustrates the video folder 425 of FIG. 4 after a user has initiated a motion picture preview of the video presentation associated with icon 410. In the embodiment illustrated in FIG. 5, the five images of the icon 410 have collapsed into a single preview window 510, which is larger than the five images. The preview window 510 provides a preview of the video presentation entitled Europe, as indicated by the playback bar 505 at the bottom of the window 510.

Section V further describes an icon's motion-picture preview window of some embodiments. This section also describes playback control buttons and features that allow a user to direct the display in the preview window in some embodiments. This section further describes alternative embodiments for a motion-picture preview icon. As further described below, some of these alternative embodiments implement the motion-picture preview icons in icons that are represented by only a single thumbnail image.

Before describing additional embodiments in Sections III-V, several definitions are provided in Section II below.

II. DEFINITIONS

As used in this document, the terms image, thumbnail, icon, motion picture, and slide show have the following definitions.

An image is a picture, a drawing, a video frame, a video field, etc.

Multi-image content is any content that includes two or more images that can be displayed in a sequence. Motion picture content is one example of multi-image content. Motion picture content is content that includes several images that are displayed in a sequence in order to provide the illusion of motion to a viewer (i.e., to provide the illusion to a viewer that objects appear to move in the images). Multi-image content includes any type of video presentation (movies, television shows, home videos, other types of video etc.), digital photographs, animations, drawings, slide shows, etc.

A slide show is a series of images that are displayed in sequence. In many digital slide shows today, multiple images in the slide show are generated from one image by zooming in and panning across the one image. However, some slide shows do not account for panning and zooming by generating multiple such images from a single image. These slide shows simply change the size of the image and the location of a window that captures the enlarged-image's portion that is shown in the slide show.

A thumbnail image is a smaller version of a larger image. A thumbnail image typically has a lower resolution than its associated larger image. A multi-thumbnail image can be defined as (1) multiple separate thumbnails, (2) a single composite thumbnail that has multiple sections with each section showing a smaller version of a larger image, or (3) some combination of a single composite image and multiple separate thumbnails.

An icon is an item in the graphical user interface (GUI) of a device. The icon represents an object (such as a document, program, folder, volume, disk, etc.) stored on the device or connected to the device. An icon has a graphical component and at times a text component. A user can perform an operation on an object through its associated icon. For instance, the user can use an object's icon to direct an operating system or application of a device to open the object (e.g., to open a storage structure, such as a media file, that stores media data, such as an image or video data). Many icons are also moveable within the GUI of an operating system or application of a device. For instance, an icon can be moved from one folder to another folder in a storage structure (e.g., folder structure or database) of an operating system or application.

III. MULTI-IMAGE ICONS

Figure 6:
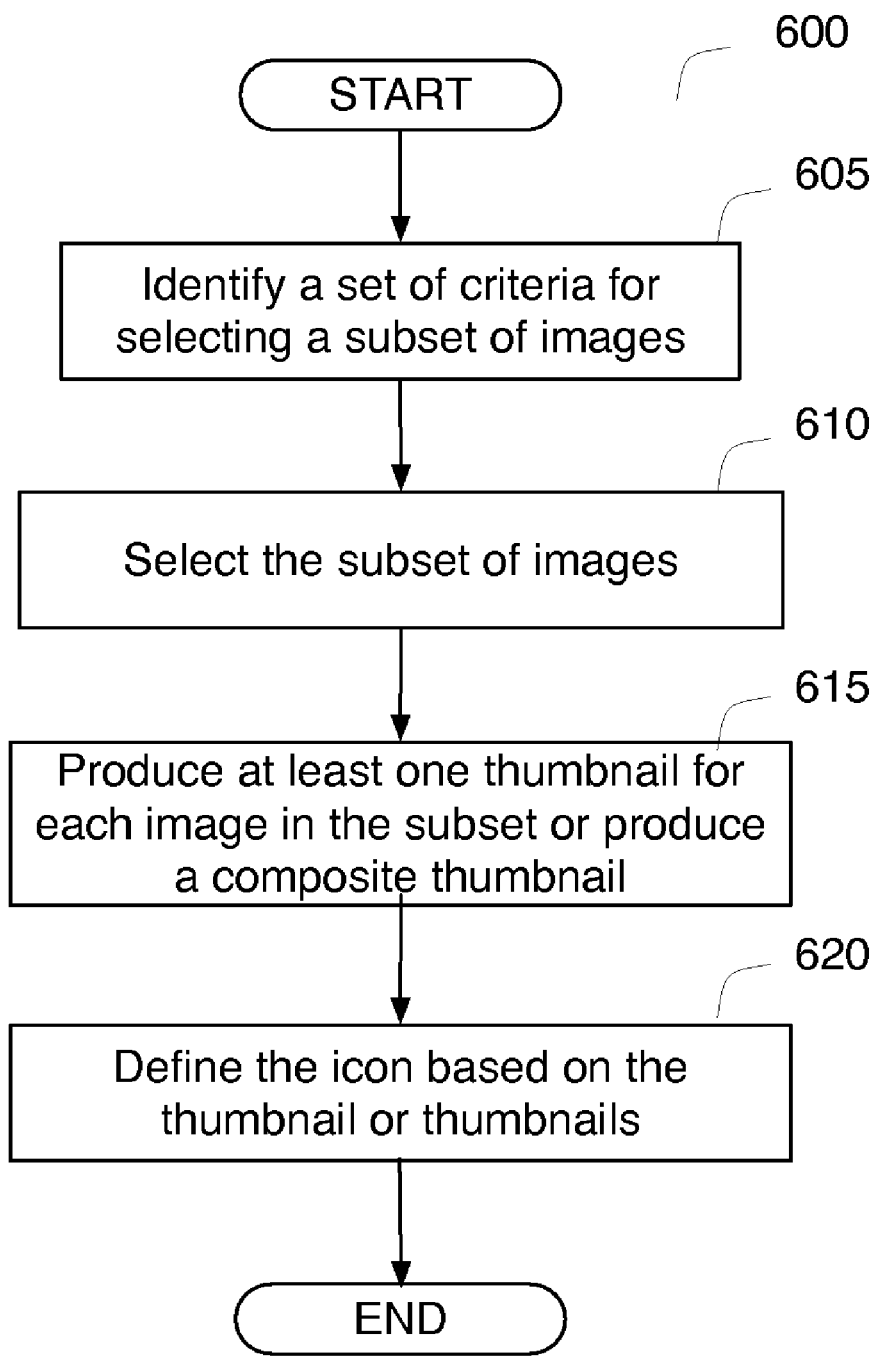
FIG. 6 illustrates a process that generates a multi-image icon that represents a set of images in the graphical user interface of a device of some embodiments of the invention.

FIG. 6 conceptually illustrates a process 600 that generates a multi-image icon that represents a set of images in the graphical user interface of a device. An application or operating system of the device performs this process automatically for each set of images that are stored on the device. In different embodiments, the device performs the process 600 at different stages. For instance, some embodiments perform the process 600 each time an image set is loaded or specified in the device. In addition, some embodiments perform this process when an image set is retrieved in response to a search (e.g., a user-specified search for particular content stored on the device or on a network connected to the device).

As shown in FIG. 6, the process initially identifies (at 605) a set of criteria to select a subset of images in the image set. The selected subset includes several, but not all, images in the image set. Hence, the set of criteria typically specifies a number to select. The selection criteria are different in different embodiments. For instance, in some embodiments, the selection criteria specify intervals to select images in the set of images. The intervals can be provided in terms of number of images or in terms of relative percentage position within the set of images. For instance, some embodiments specify the selection of the nth frame in a video and every mth frame after that until x number of frames have been selected, where n, m, and x are integers. Other embodiments specify frames that appear after the 20%, 40%, 60%, and 80% mark in the set. In other embodiments, the selection criteria are based on the content of the images. For example, the selection criteria might specify that images that occur before or after scene changes in a motion picture need to be selected.

Some embodiments do not allow a user to adjust the selection criteria. On the other hand, other embodiments allow a user to specify or adjust the set of selection criteria (e.g., allow a user to adjust the specified numerical or percentage intervals for selecting images in the set of images), through preference settings of an operating system or an application of the device.

Moreover, as further described below, some embodiments allow a user to specify a different set of images after automatically selecting and displaying the subset of images.

As shown in FIG. 6, the process 600 selects (at 610) the subset of images based on the set of criteria identified at 605. Specifically, in some embodiments, the process uses the selection criteria to identify a certain number of images in the storage structure or structures that contain the set of images. For instance, in some embodiments, the process selects the nth frame in a video and every mth frame after that until x frames have been selected, where n, m, and x are integers. Other embodiments would select images in a video by identifying scene changes in the video and selecting images that occur before or after the scene changes. Some embodiments use known techniques for identifying scene changes in a video (e.g., by identifying when differences between successive images in the set exceeds a threshold to indicate a potential scene change in the motion picture).

In some embodiments, the set of images is encoded in a particular format. For instance, in some cases, the set of images is an MPEG encoded video. Accordingly, in these cases, the process would decode the selected subset of images that are stored in an encoded manner. In some embodiments, the process uses a media player to retrieve and decode encoded images from a storage structure or structures that store the images (e.g., uses a Quicktime player to retrieve and decode MPEG encoded frames from an AVI file).

After 610, the process generates (at 615) at least one thumbnail image for each image selected at 610, or generates (at 615) one composite thumbnail for all the images selected at 610. The process 600 generates multiple thumbnail images for each image in some embodiments. As further described below in Section V, some embodiments use multiple thumbnail images for each image in the selected subset, in order to provide a motion-picture transition from a static multi-image preview within a motion-picture's icon, to a dynamic motion-picture preview within the icon. Other embodiments provide the motion-picture transition by using only the single composite thumbnail. To generate a thumbnail version of a selected image, the process 600 can use any known techniques for generating a lower resolution, smaller image from a higher resolution, larger image. At 615, the process also stores in a cache some or all the thumbnails that it generates in some embodiments, in order to facilitate quick retrieval of the thumbnails whenever they are needed.

Next, at 620, the process defines and stores an icon to represent the set of images. In defining the icon, the process uses (at 620) the thumbnails or thumbnail produced at 615 to form a part of the graphical representation of the icon. In case of the multiple thumbnails, these thumbnails are arranged in the icon's pictorial representation (i.e., are defined in the icon's image file) based on an order that is indicative of the order of the selected subset of images in the set of images. Similarly, the composite thumbnail includes several image sections (1) that are smaller versions of the selected subset of images, and (2) that are arranged in the composite in an arrangement that is indicative of the order of the selected subset of images in the set.

Once the icon for an image set is defined, the icon's pictorial representation will provide its viewer immediately with information about the content of the image set, as it provides a concurrent preview display of several images in the set according to the order in which these images appear in the set.

As described above, FIG. 4 provides one example of how some embodiments define each icon for a set of images. Specifically, this figure illustrates that some embodiments define a multi-image icon in terms of five images, with the first image being larger and the other four images arranged in two rows to the right of the larger image. This figure also provides an example of how the order of the images in the icon's graphical representation relates to the order of their corresponding images in the image set. For instance, the arrangement of the images 430, 435, 440, 445, and 450 of icon 410 is indicative that (1) the frame of image 430 appears in the video before the frame of image 435, (2) the frame of image 435 appears in the video before the frame of image 440, (3) the frame of image 440 appears in the video before the frame of image 445, and (4) the frame of image 445 appears in the video before the frame of image 450. The five displayed images 430-450 can be defined as five separate thumbnails, can be defined in a single composite thumbnail that includes five sections that show smaller versions of the five video frames, or some combination of a single composite image and multiple separate thumbnails.

Figure 7:
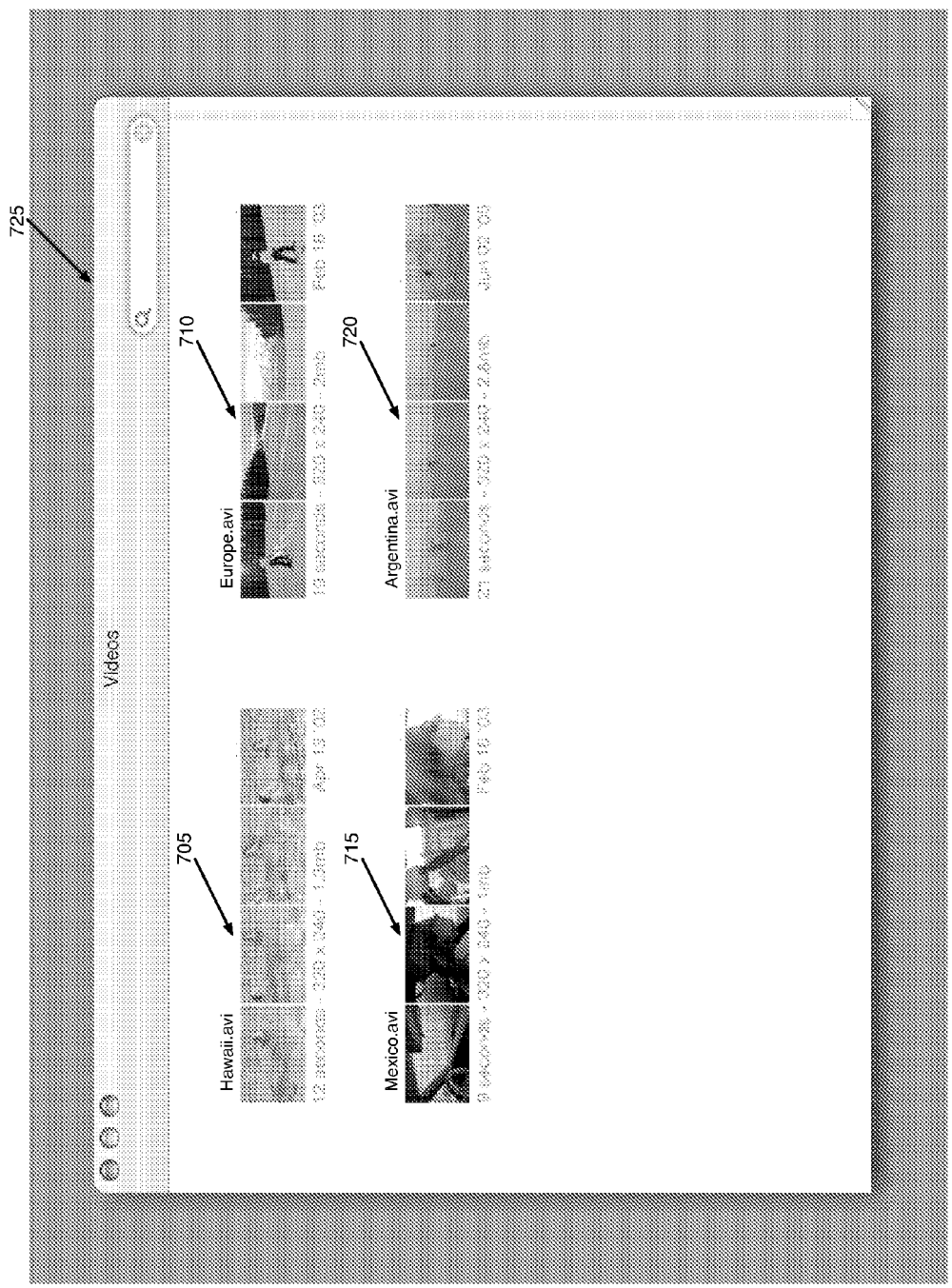
FIG. 7 illustrates an arrangement of the thumbnails in the pictorial representation of icons in some embodiments of the invention.

Other embodiments arrange the images differently in the image file of the icon. For instance, FIG. 7 illustrates another arrangement of the images in the pictorial representation of icons. Specifically, it illustrates four icons 705-720 of the four video clips that are stored in a folder 725 entitled Videos.

Each icon also has a graphical component that illustrates four images of four frames in the video clip. The four images all have the same size and are arranged in a single row. The four displayed images can be defined as four separate thumbnails, can be defined in a single composite thumbnail that includes four sections that show smaller versions of the four video frames, or some combination of a single composite image and multiple separate thumbnails.

In each icon 705-720, the order of the displayed images is based on the order of the frames in the icon's corresponding video clip. Specifically, each image that appears to the left of another image has a frame in the video that is before the frame of the other image. The combination of an icon's displayed images and the order for their display provides a user with immediate information about the subject matter of the video associated with the icon.

As in the icons of FIG. 4, each icon in FIG. 7 has a text component that provides the name of the video associated with the icon. Also, other metadata (e.g., duration, resolution, size, and date in this example) of each video appears below the video's icon in FIG. 7. Other embodiments might display other metadata.

As mentioned above, some embodiments allow a user to select the arrangement or size of the images that appear in the multi-image preview (e.g., allow the user to make such choices through the settings of the operating system or an application of the device). Some embodiments also allow a user to change the images that appear in the multi-image preview (e.g., to change the thumbnails in the icons). For instance, some embodiments allow the user to select an image in the multi-image preview (e.g., through a right cursor-button click operation), to control a playback of the video through a scroll bar that appears across the preview, and then to identify (e.g., by releasing the scroll bar) the frame in the video that should replace the selected image.

Figure 8:
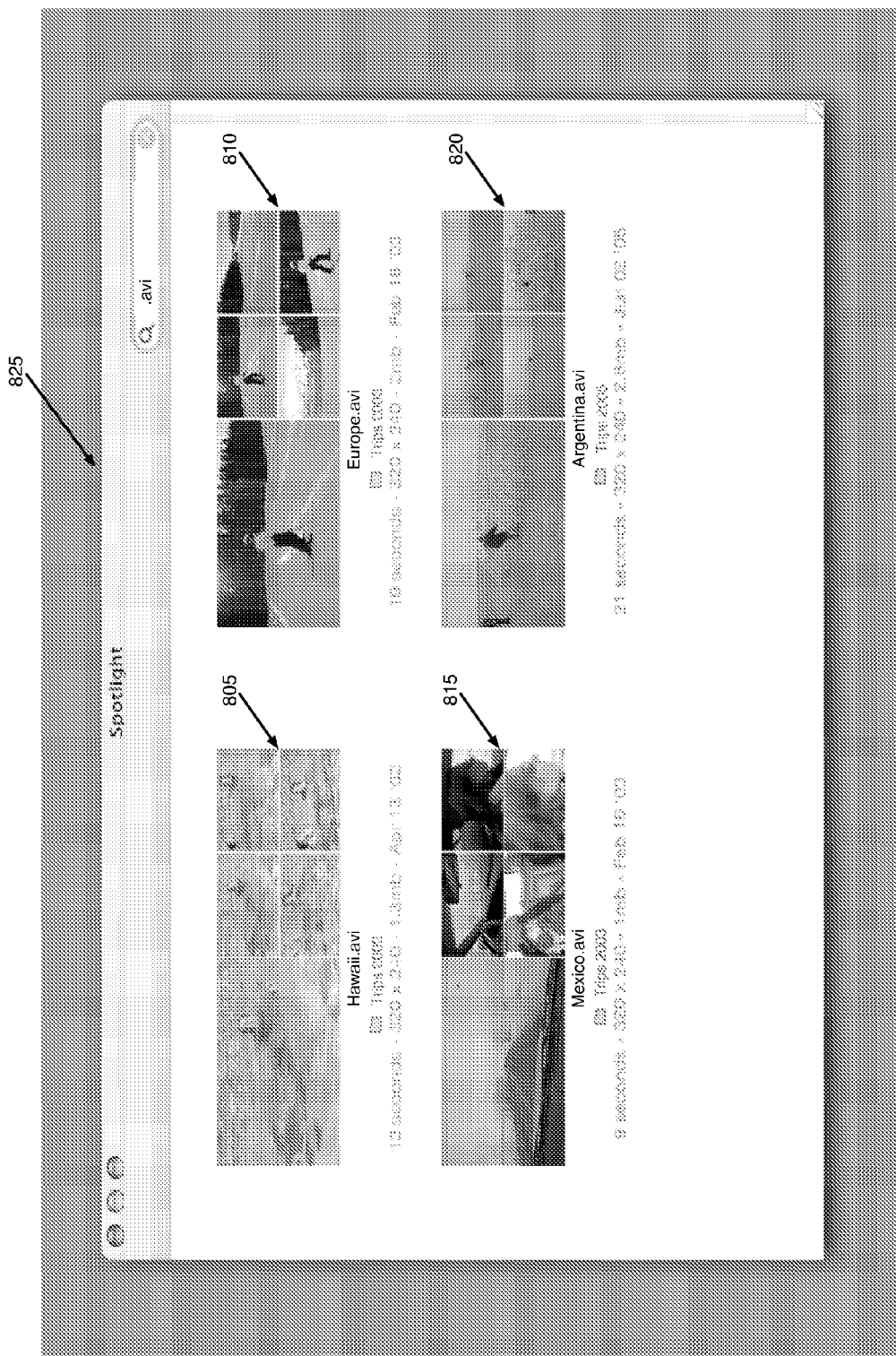
FIG. 8 illustrates a search window that displays multi-image icons of videos of some embodiments of the invention.

FIGS. 4 and 7 illustrate embodiments that are implemented in a nested folder structure of an operating system. The multi-image icons of the invention can also be used by operating system or applications of the device to display results of searches, etc. For instance, FIG. 8 illustrates a Spotlight search window 825 (used by the OS X operating system of Apple Computer, Inc.) that displays four multi-image icons 805-820 of four video. As shown in this figure, the Spotlight search has identified the four videos after performing a search of its locally stored content for any AVI file.

Like in FIGS. 4 and 7, the images are arranged in each multi-image icon in FIG. 8 in an order that is indicative of the position of their corresponding frame in the video. Also, like the examples illustrated in FIGS. 4 and 7, each icon in FIG. 8 has a text component that provides the name of the video associated with the icon. As in FIG. 7, metadata (e.g., the duration, resolution, size, and date) of each video clip appears below the clip's icon in FIG. 8. In the Spotlight result window 825, the folder that contains each video is also identified below each video clip's corresponding multi-image icon. For instance, "Trips 2003" is identified as the folder that contains the Europe.avi video clip, which is represented in the window 825 by icon 810.

Figure 9:
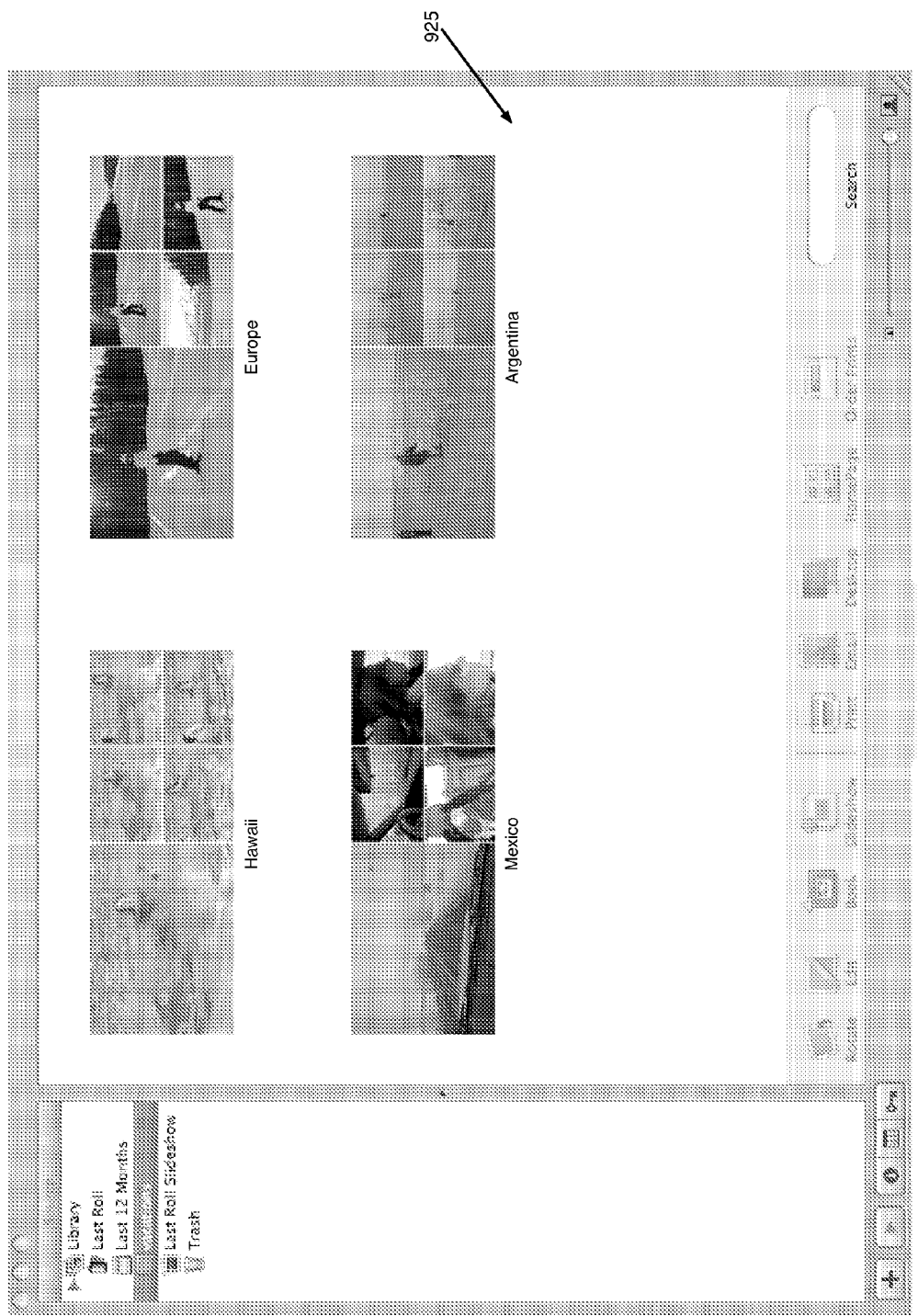
FIG. 9 illustrates a graphical user inter face of a photo editing/organizing application having multi-image icons of some embodiments of the invention.

The multi-image icons of the invention can also be used by the GUI's of application programs to display multi-image content that are being organized, stored and/or edited by the programs. For instance, FIG. 9 illustrates the GUI 925 of a photo editing/organizing application. This photo editing/organizing application displays four multi-image icons of four digital film rolls, where a digital film roll is a set of digital images that are imported (from an external source, such as a digital camera or memory, or from an internal folder) into the photo organizing application during one import session. As shown in this figure, the film rolls are stored in a folder called vacations.

Each film roll is represented by five images that represent five pictures in the film roll. Like in FIGS. 4, 7, and 8, the images are arranged in each multi-image icon in FIG. 9 in an order that is indicative of the position of their corresponding picture in the film roll. The five displayed images can be defined as five separate images, can be defined in a single composite thumbnail that includes five sections that show smaller versions of the five pictures, or some combination of a single composite image and multiple separate thumbnails. Like the examples illustrated in FIGS. 4, 7, and 8, each icon in FIG. 9 also has a text component that provides the name of the film roll associated with the icon.

In some embodiments, the photo organizing application in FIG. 9 is the iPhoto application of Apple Computer, Inc. Other embodiments might be implemented in other photo organizing applications that operate on a device or are accessible through a network, such as a network of networks (like the Internet).

The photo organizing application 925 can also use the multi-image icons of the invention to represent photo albums, slide shows and videos that it stores. Moreover, video editing applications (like iMovie of Apple Computer, Inc., Final Cut Pro of Apple Computer, Inc., etc.) can also use multi-image icons to represent different video presentations and video projects that they import, edit, generate, etc.

Figure 10:
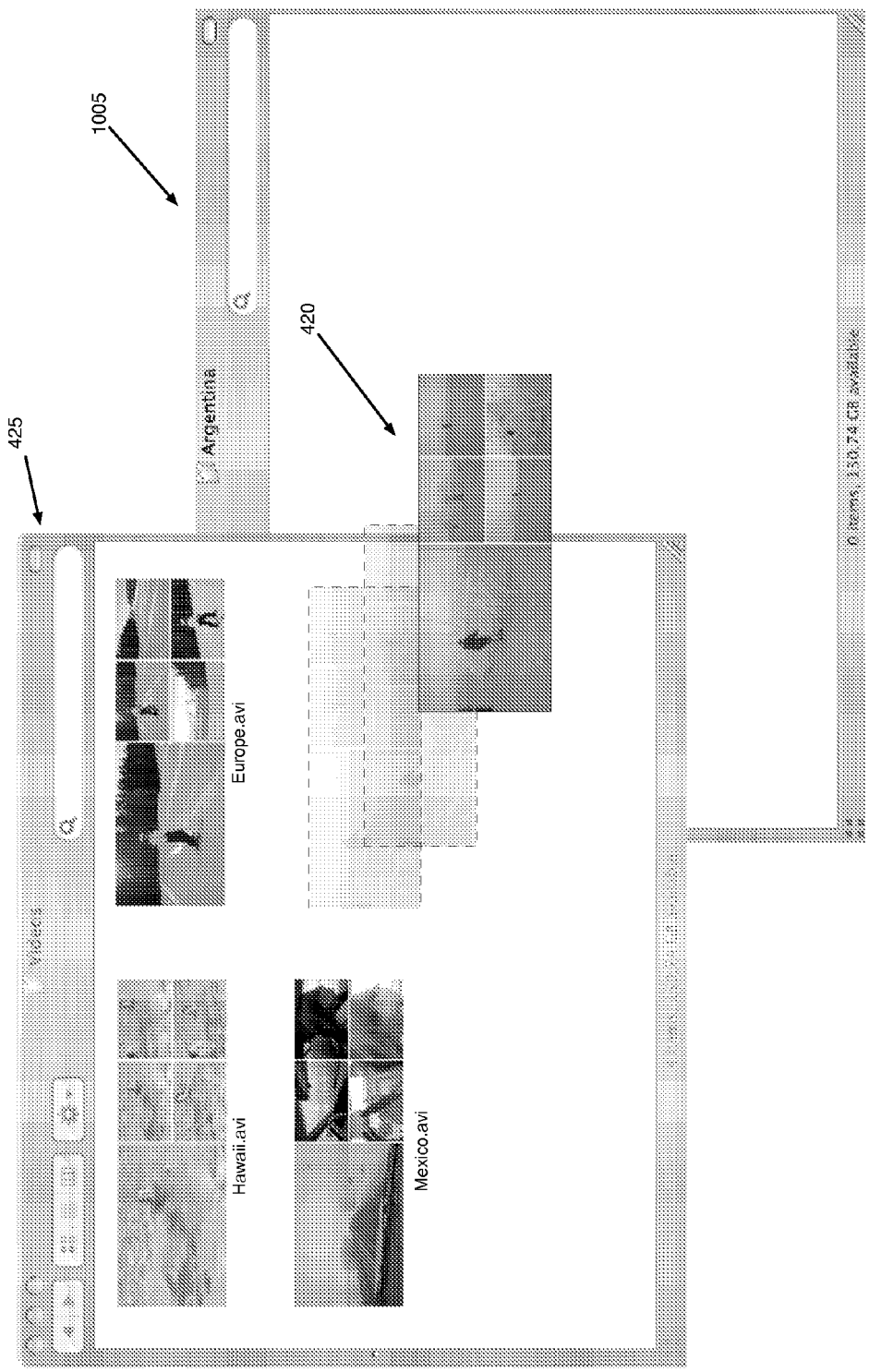
FIGS. 10 and 11 illustrate an example of moving a multi-image icon from one folder to another in some embodiments of the invention.
Figure 11:
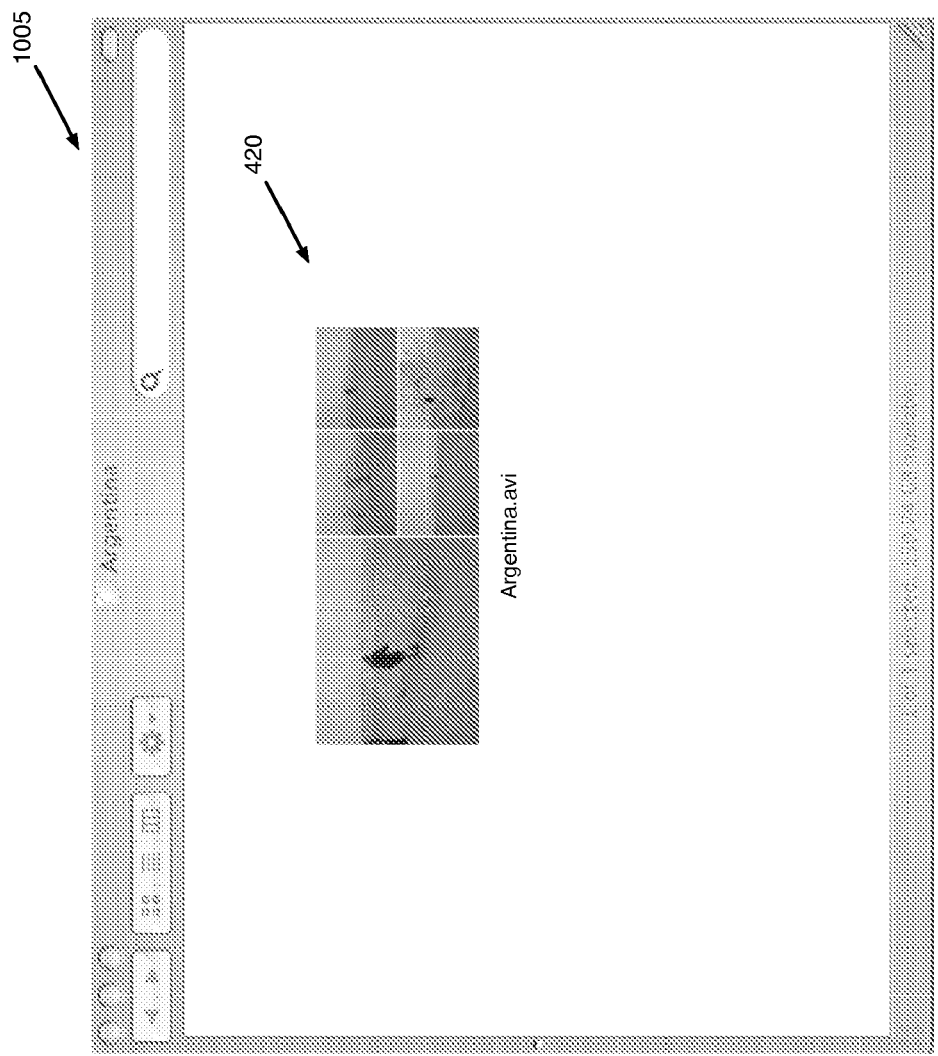

In some embodiments, the multi-image icons of FIGS. 4, 7, 8, and 9 not only open the media files that store their associated media data, but also can be selected and moved across (e.g., through click and drag operations) the GUI of the operating system or applications that use these icons. For instance, FIGS. 10 and 11 illustrate an example of moving (e.g., through a click and drag operation) the multi-image icon 420 from the folder 425 to a folder 1005.

Also, in some embodiments, each image in a multi-image icon (such as the ones illustrated in FIGS. 4 and 7) can serve as a link to access its corresponding image in the set of images. For instance, some embodiments allow a user to direct a media player to start a video at a particular frame by selecting (e.g., double clicking) an image that represents the frame in video's multi-image icon. In this manner, the multiple images serve as multiple different access points to multiple different sections in a media presentation.

Figure 12:
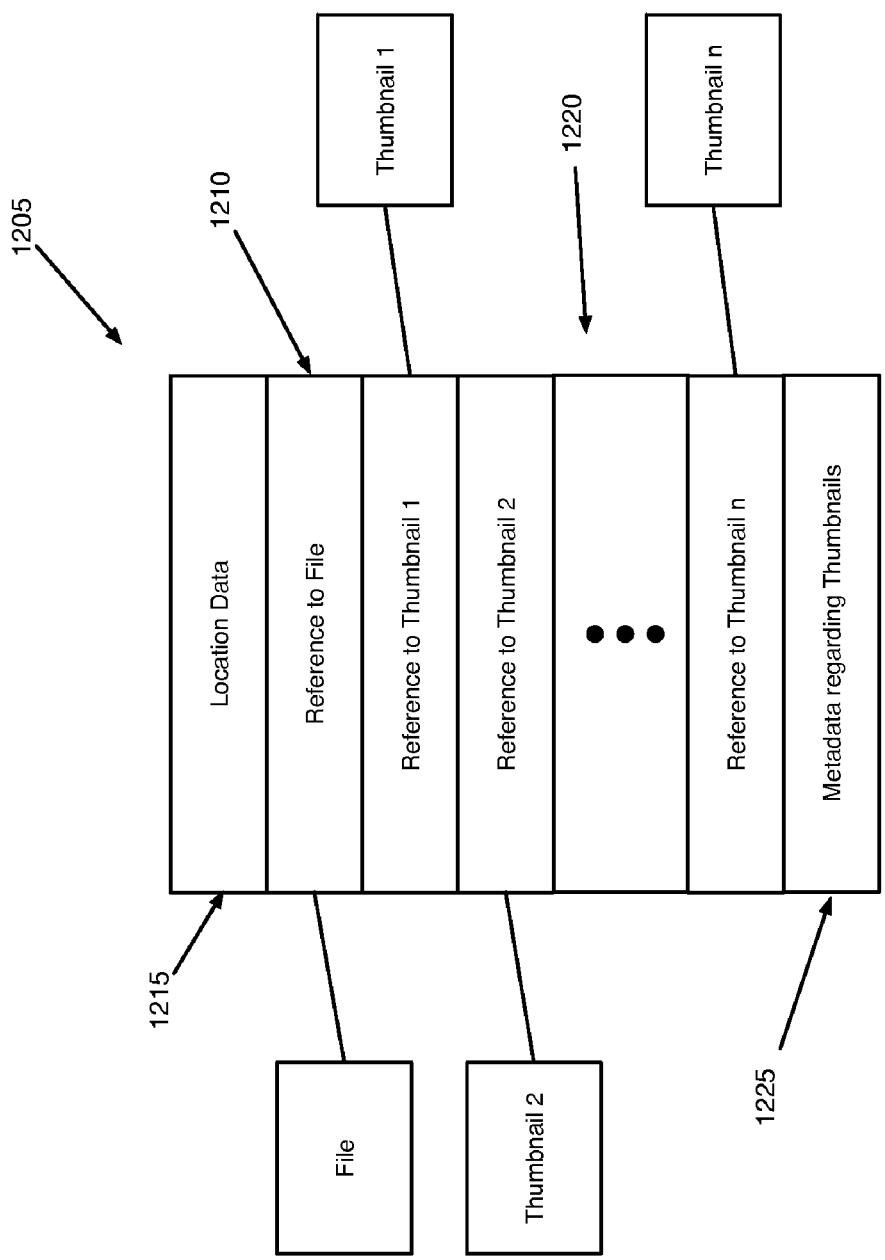
FIG. 12 illustrates a data structure used to represent a multi-image icon of some embodiments of the invention.

FIG. 12 conceptually illustrates a data structure 1205 used in some embodiments to represent a multi-image icon. As shown in this figure, the data structure 1205 includes a reference 1210 to the file or files that contains the set of images associated with the icon. It also includes location data 1215 that specifies the location (e.g., the folder containing the icon, the position of the icon, etc.) of the icon in the GUI. The data structure also includes (1) multiple references 1220 to multiple thumbnails of images in the set of images represented by the icon, and (2) metadata 1225 related to these thumbnails (e.g., to the arrangement of the thumbnails, to the identity of their corresponding images in the set of images, etc.).

Figure 13:
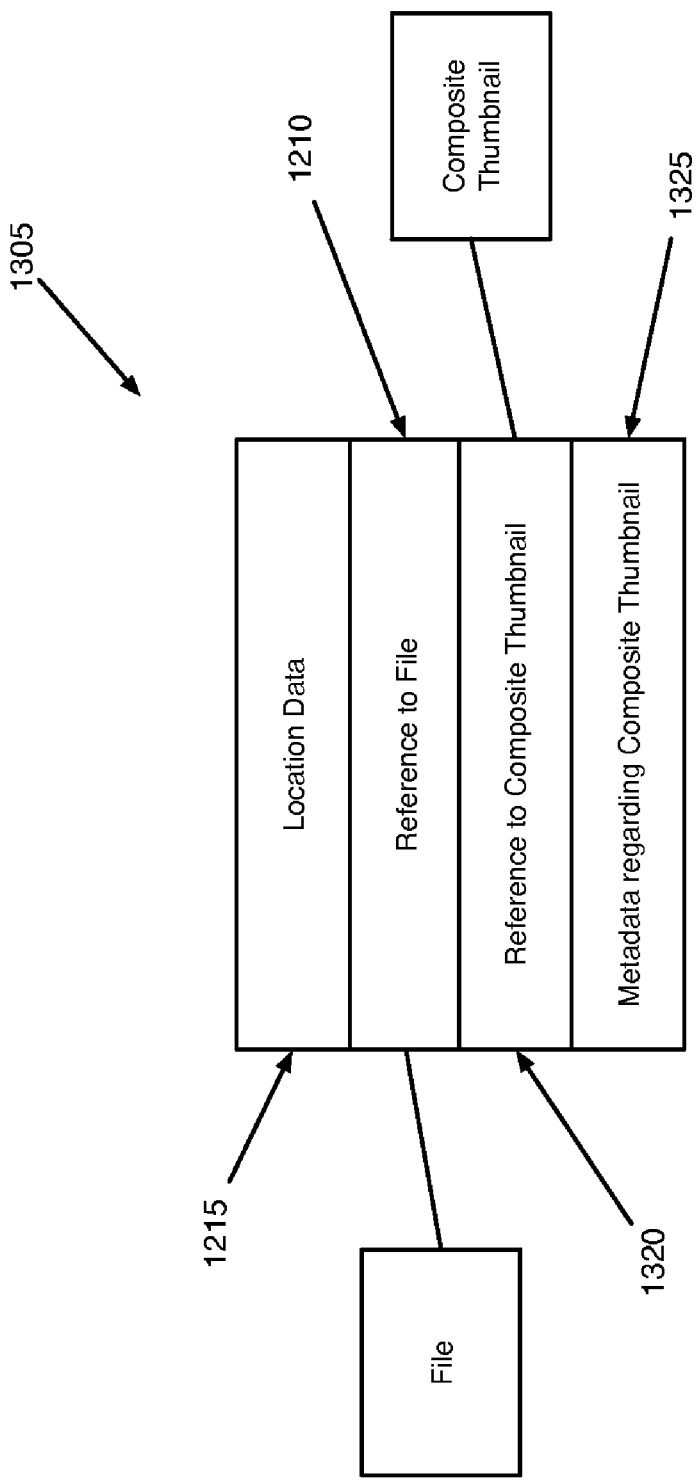
FIG. 13 illustrates another data structure used to represent a multi-image icon of some embodiments of the invention.

FIG. 13 conceptually illustrates another data structure 1305 used by other embodiments to represent a multi-image icon. Like the data structure 1205, the data structure 1305 includes (1) a reference 1210 specifying the file or files that contains the set of images associated with the icon, and (2) location data 1215 specifying the location of the icon in the GUI. Unlike the data structure 1205, the data structure 1305 includes only a single reference 1320 to a single composite thumbnail that represents the displayed subset of images in the set of images represented by the icon. The data structure 1305 also includes metadata 1325 that specifies the various different sections of the composite thumbnail, where each section displays a smaller version of a particular image in the set of images. The metadata 1225 and 1325 specify in some embodiments, additional data regarding how the thumbnails should be manipulated during the motion-picture transition from the static multi-image presentation to the dynamic motion-picture preview presentation.

IV. MULTI-IMAGE PREVIEW FOR AN ICON

Several embodiments described above use the multi-image representation of a set of images as the graphical component of an icon that represents the set of images. Other embodiments, however, might not use a multi-image representation of an image set in such a manner. For instance, some embodiments use the multi-image representation of a multi-image content not in the content's associated icon but rather in a preview window that opens when a user selects the icon.

Figure 14:
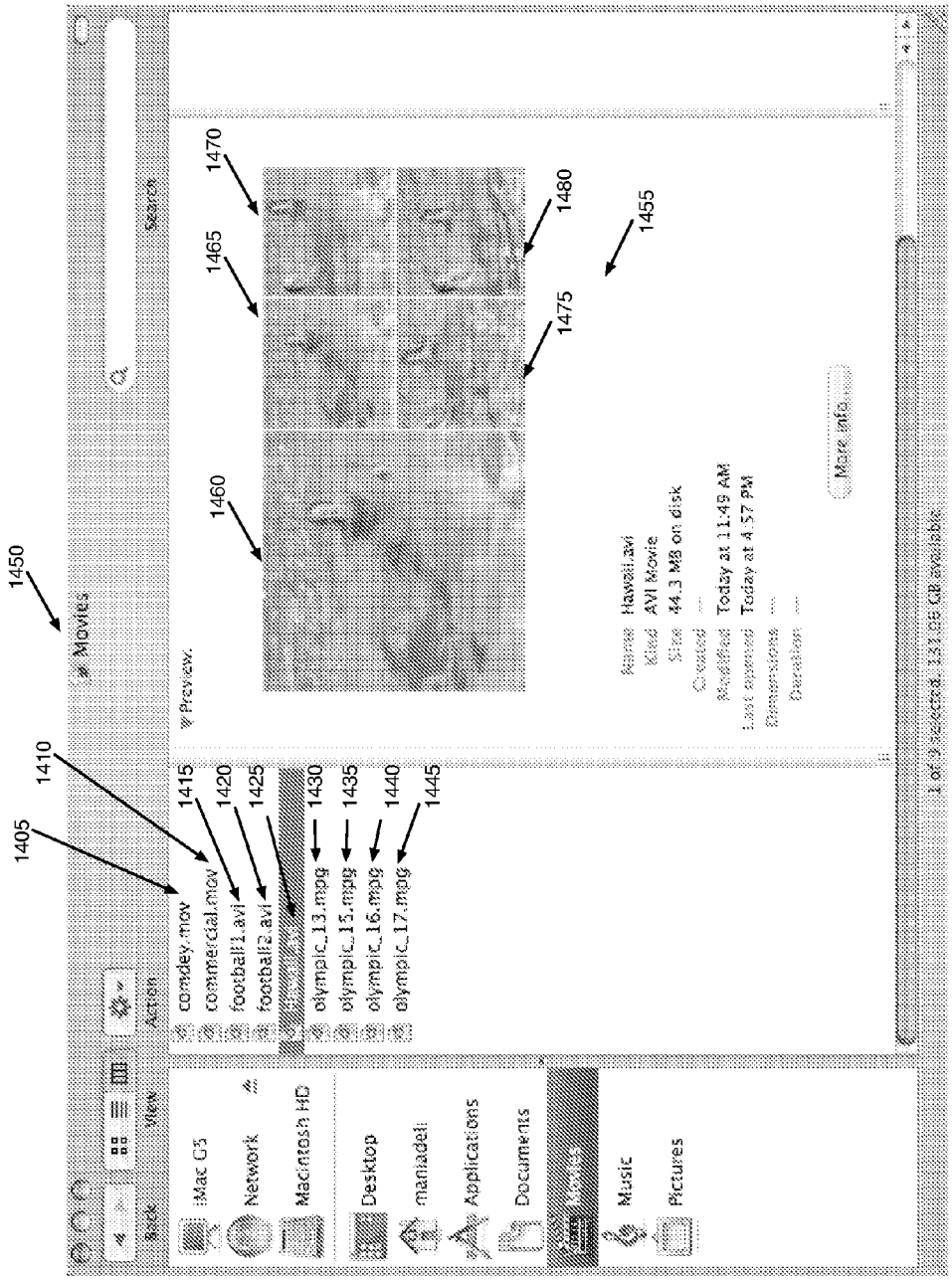
FIG. 14 illustrate a multi-image content in a preview window of some embodiments of the invention.

FIG. 14 illustrates one such embodiment. Specifically, it illustrates nine icons 1405-1445 of nine videos that are stored in a folder 1450 entitled Movies. Each icon has a text component that provides the name of the video associated with the icon. Each icon also has a graphical component that is not descriptive of the subject matter of the content of the icon. In particular, the graphical components of the icons simply illustrate that the Quicktime media player has been designated as the application that will open the icon's corresponding video file.

Each icon also has a graphical preview that is formed by five images of five frames in the icon's video clip. In the graphical preview, the five images can be defined as five separate thumbnails, can be defined in a single composite thumbnail that includes five sections that show smaller versions of the five pictures, or some combination of a single composite image and multiple separate thumbnails.

In the example illustrated in FIG. 14, an icon's graphical preview is displayed to the right of the icon when the icon is selected. Specifically, FIG. 14 illustrates the contents of the Movies folder in a Column view of the OS X operating system. It also illustrates the selection of the icon 1425 entitled Hawaii, and the display of this icon's associated five image preview 1455 in the column that is to the right of the column that represents the Movies folder.

In this multi-image preview 1455, the first image is larger than the other four images and the other four are arranged in two rows to the right of the larger image. The order of the images in the icon's graphical preview relates to the order of their corresponding images in the image set. For instance, the arrangement of the images 1460, 1465, 1470, 1475, and 1480 is indicative that (1) the frame of image 1460 appears in the video before the frame of image 1465, (2) the frame of image 1465 appears in the video before the frame of image 1470, (3) the frame of image 1470 appears in the video before the frame of image 1475, and (4) the frame of image 1475 appears in the video before the frame of image 1480. The combination of an icon's displayed images and the order for their display provides a user with information about the subject matter of the video associated with the icon.

Other embodiments arrange the images differently in the graphical preview for the icon. For instance, some embodiments arrange the images in an icon's graphical preview in one row or in one column. Also, even though FIG. 14 illustrates the multi-image graphical preview of some embodiments in the context of the folder structure of an operating system, one of ordinary skill will realize that such multi-image previews can be used in other contexts in the GUI's of the operating system and/or applications of a device.

V. MOTION-PICTURE PREVIEW ICON

A. Multi-Image Icons

Figure 15:
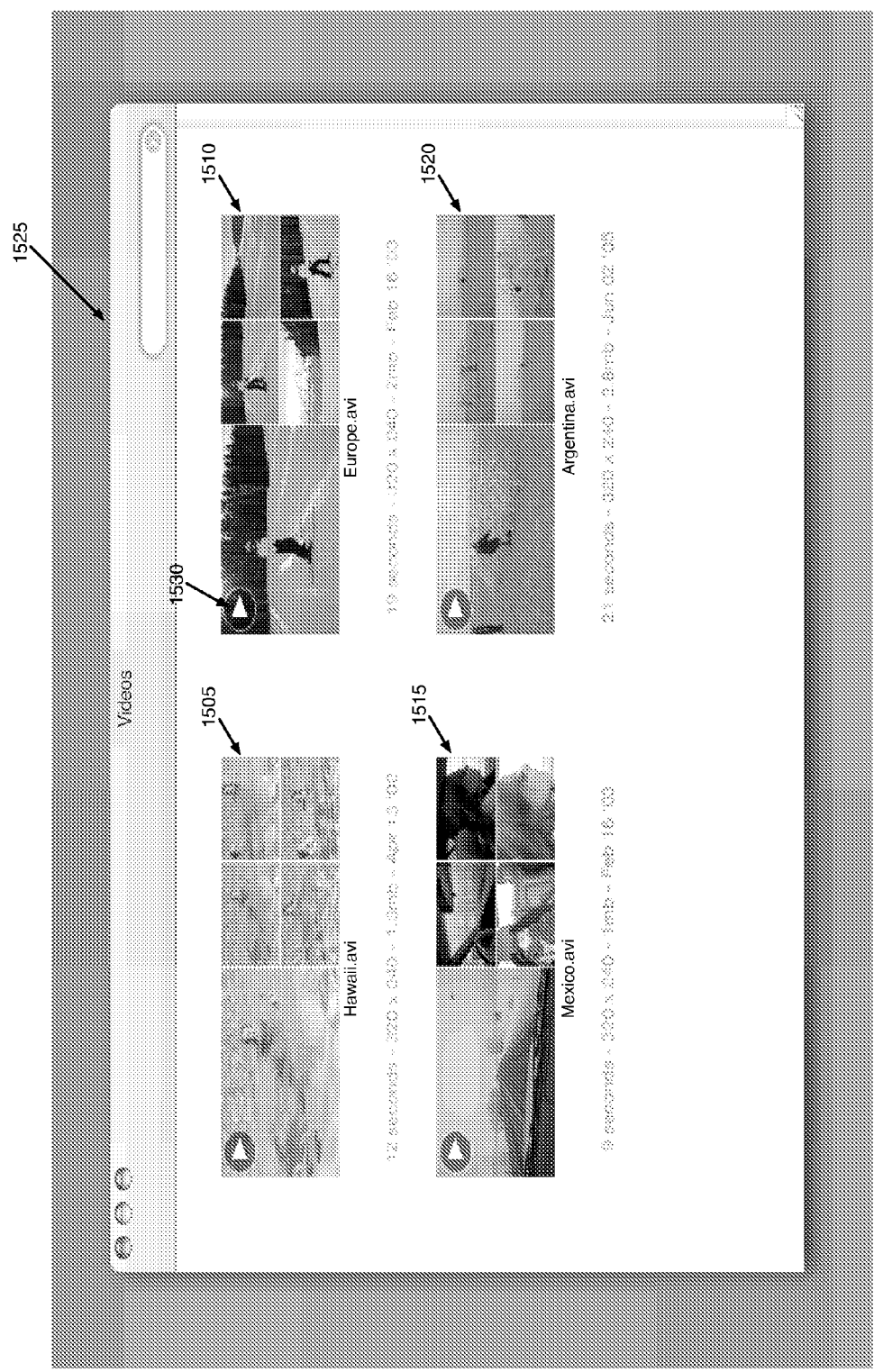
FIG. 15 illustrates multi-image icons of videos that are stored in a folder of some embodiments of the invention.
Figure 16:
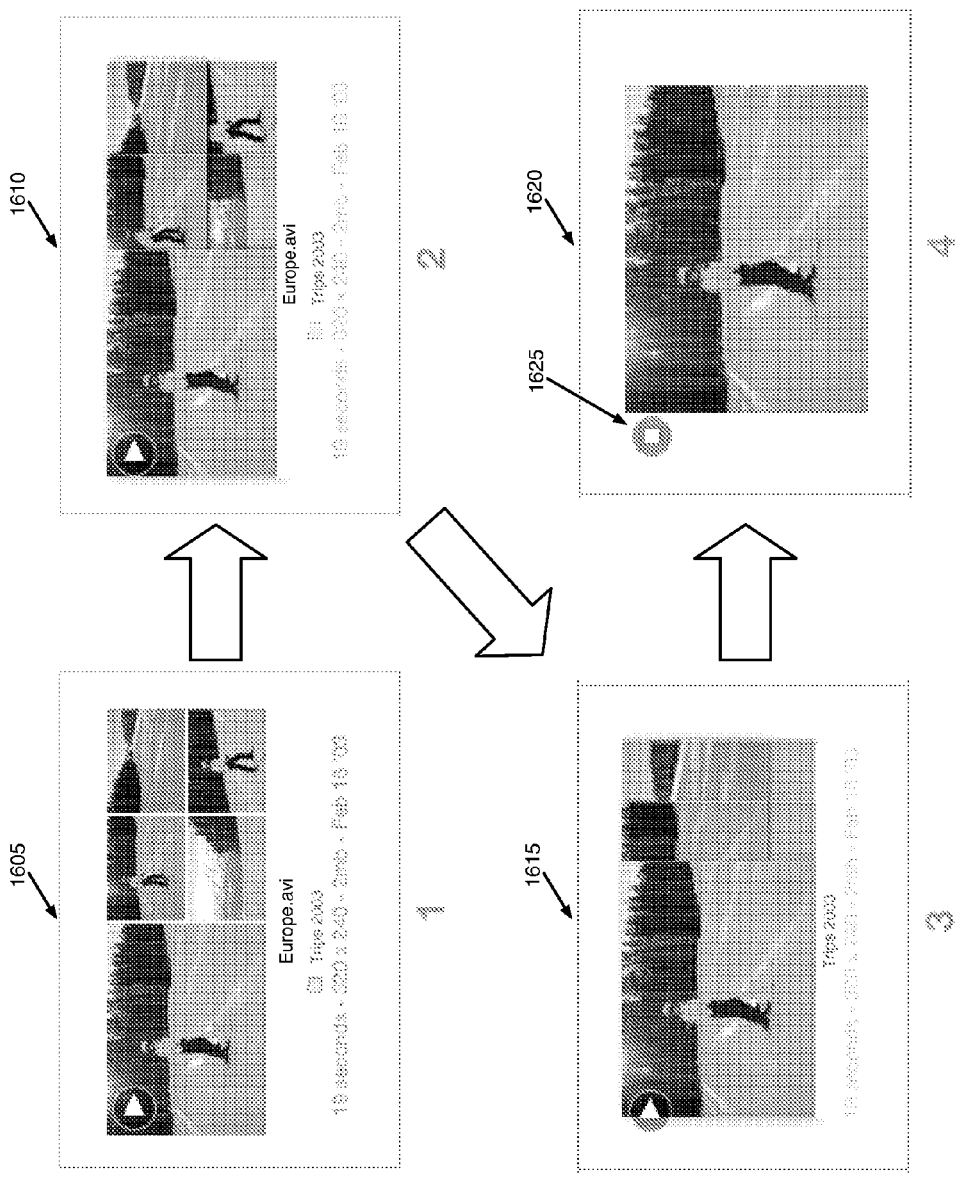
FIG. 16 illustrates four stages of a motion-picture transition for the case when a user selects the play button of some embodiments of the invention.

FIGS. 5, 15, and 16 present an example that illustrates the motion-picture preview icon of some embodiments. In this example, each motion-picture preview icon is a multi-image icon, which provides a static multi-image preview of a set of images represented by the icon. Each such icon also provides a dynamic motion-picture preview within its graphical component. In addition, when a user requests such a dynamic motion-picture preview, each icon provides a motion picture transition from its static multi-image preview to its dynamic motion-picture preview.

More specifically, FIG. 15 illustrates four icons 1505-1520 of the four videos that are stored in a folder 1525 entitled Videos. Each icon has a text component that provides the name of the video associated with the icon. Also, the duration, resolution, size, and date of each video appears below the video's icon in FIG. 15.

Each icon also has a graphical component that illustrates five images of five frames in the video. The five images have the arrangement that was described above by reference to FIG. 4. Other embodiments, however, can use a different number or arrangement of the images in each motion picture preview icon of FIG. 15.

As in FIG. 4, the order of the images in each icon 1505-1520 is based on the order of the images in the icon's corresponding video. The combination of an icon's displayed images and the order for their display provides a user with immediate information about the subject matter of the video associated with the icon.

When a user wishes to get a better understanding of this subject matter, the user can request a playback of the video (e.g., by selecting a play button 1530 of the icon, by selecting the icon and initiating a playback through a keyboard operation, etc.). The icon then provides a motion-picture transition from the image window that contains the five images to a larger window that contains only one of the images, before starting to display the video clip in the larger window.

FIG. 16 illustrates an example of this motion-picture transition for the case when a user selects the play button 1530 of the multi-image icon 1510 of FIG. 15. Specifically, FIG. 16 illustrates four stages during this transition. The first stage 1605 represents the appearance of the icon before its playback button 1530 has been selected by the user. The second stage 1610 represents the appearance of the icon a moment (e.g., 0.125 second) after the user has selected the playback button. The third stage 1615 represents the appearance of the icon a moment after the second stage, while the fourth stage 1620 represents the appearance of the icon a moment after the third stage. In some embodiments, the duration of the motion-picture transition is less than one second (e.g., 0.5 seconds).

As illustrated by the second, third, and fourth stages in FIG. 16, the motion picture transition of the icon 1510 causes the smaller images to gradually disappear behind the larger image. Also, during this transition, the icon's overall graphical window (i.e., the window that contains the graphical component of the icon) becomes larger. Each image also becomes larger. As mentioned above, the process 600 generates multiple thumbnails at multiple different sizes and resolutions in some embodiments. Accordingly, some embodiments provide the illusion of the enlarging thumbnails by sequentially replacing smaller stored thumbnails with larger stored ones in the icon display.

Other embodiments enlarge the thumbnails through mathematical interpolation operations, in conjunction or in lieu of using multiple thumbnails for each image in the icon's graphical representation. For instance, as mentioned above, some embodiments generate a single composite thumbnail to represent all the images in the displayed subset of images. Some of these embodiments store metadata that specifies sections of the composite thumbnail that relate to different images in the subset. Accordingly, some embodiments use this metadata to divide the composite thumbnail into its sections. During the motion-picture transition, these embodiments perform scaling and interpolation operations to resize the images in each section. These embodiments then use the original composite thumbnail and these resized images to generate the icon's graphical display during the motion-picture transition. In other words, they generate the motion-picture transition by sequentially displaying the original composite thumbnail followed by a series of other graphical representations of the icon, where each graphical representation includes the sections resized by a particular amount.

In FIG. 16, each particular thumbnail or section has a layer order (e.g., an order that specifies the thumbnail or section that is in front or behind the particular thumbnail). One corner of each thumbnail or section is also defined at a fixed location in the icon's graphical window. Specifically, the top left corner of the leftmost thumbnail or section is fixed at the top left corner of the icon window, the top right corner of the top rightmost thumbnail or section is fixed at the top right corner of the icon window, the bottom right corner of the bottom rightmost thumbnail or section is fixed at the bottom right corner, and the top and bottom left corner of the top and bottom middle thumbnails or sections are respectively fixed to locations on the top and bottom sides of the icon window.

Accordingly, because of these design choices, the thumbnails or sections start to overlap one another as they become larger, until the larger one (i.e., the leftmost thumbnail or section in the original multi-image representation in FIG. 15) completely covers the graphical window of the icon. Other embodiments might not make these same design choices. For instance, some embodiments might not enlarge the icon's overall graphical window during the motion-picture transition of the icon. Also, other embodiments might animate the transition differently. For instance, some embodiments might have the thumbnails or sections swirl in a circle during the transition.

Once the icon reaches stage four during its motion-picture transition, the icon's enlarged graphical window (which now only displays the largest thumbnail) starts to provide a motion picture preview of the video clip, as shown in FIGS. 5 and 16. To provide this motion picture preview, some embodiments direct an application (e.g., a media player) to retrieve frames from the video file associated with the icon, and decode each frame for display. Some embodiments have the application perform this operation without a visual indication to the user that the application has been opened.

When the motion picture preview starts in the icon's enlarged graphical window, certain playback controls appear in or with the icon. For instance, a stop button 525 replaces the icon's play button 1530, as shown in FIGS. 5 and 16. As further shown in FIG. 5, a playback bar 505 appears at the bottom of the icon's graphical window to indicate the location in video clip that is being displayed at any given time. In particular, the bar 505 has a scrolling marker 515 that scrolls horizontally across the bar to identify the amount of the video clip played at a given time, the amount of the video clip remaining at a given time, and the position in the video clip being displayed at a given time. In some embodiments, a user can select and drag the scrolling marker (e.g., through a click and drag operation) in a horizontal direction in order to view frames at other times in the video clip.

Figure 17:
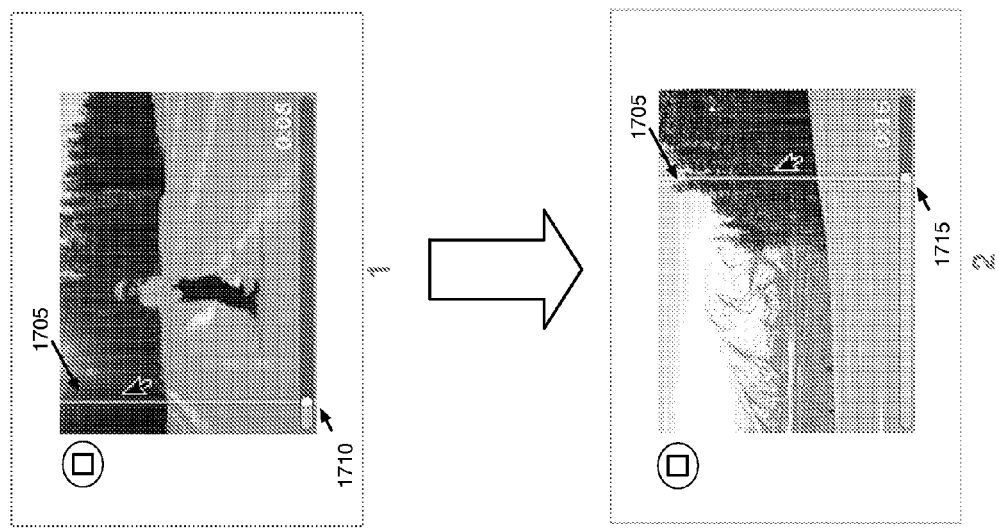
FIG. 17 illustrates a geometric shape that scrolls across an icon during a motion picture preview of the icon of some embodiments of the invention.

To assist the user to perform such dragging operations, some embodiments provide a larger geometric shape that scrolls across the icon during the motion picture preview of the icon. FIG. 17 illustrates one such example. Specifically, it illustrates a line bar 1705 that emanates from the scrolling marker 515 and traverses the height of the icon's graphical preview window. A user can select this line bar (e.g., through a click and drag operation) and drag it and the marker 515 horizontally to a new location, in order to view the frame that is at the time (in the video clip) associated with the new location of the line bar and scrolling marker.

FIG. 17 illustrates the dragging of the line bar 1705 from location 1710 in the playback bar 505 (which corresponds to the eighth second in the playback) to location 1715 (which corresponds to the sixteenth second in the playback). It also illustrates the corresponding change in the video frame that is displayed in the graphical preview window of the icon. Some embodiments allow a user to select the line bar 1705 by clicking anywhere within the graphical preview window of the icon (i.e., anywhere in the icon window that is displaying the motion picture preview) and perform a drag operation. In these embodiments, the line bar serves as an indication of the location in the video (or more generally, in the image set) that is being displayed in the motion picture preview at any given time.

Figure 18:
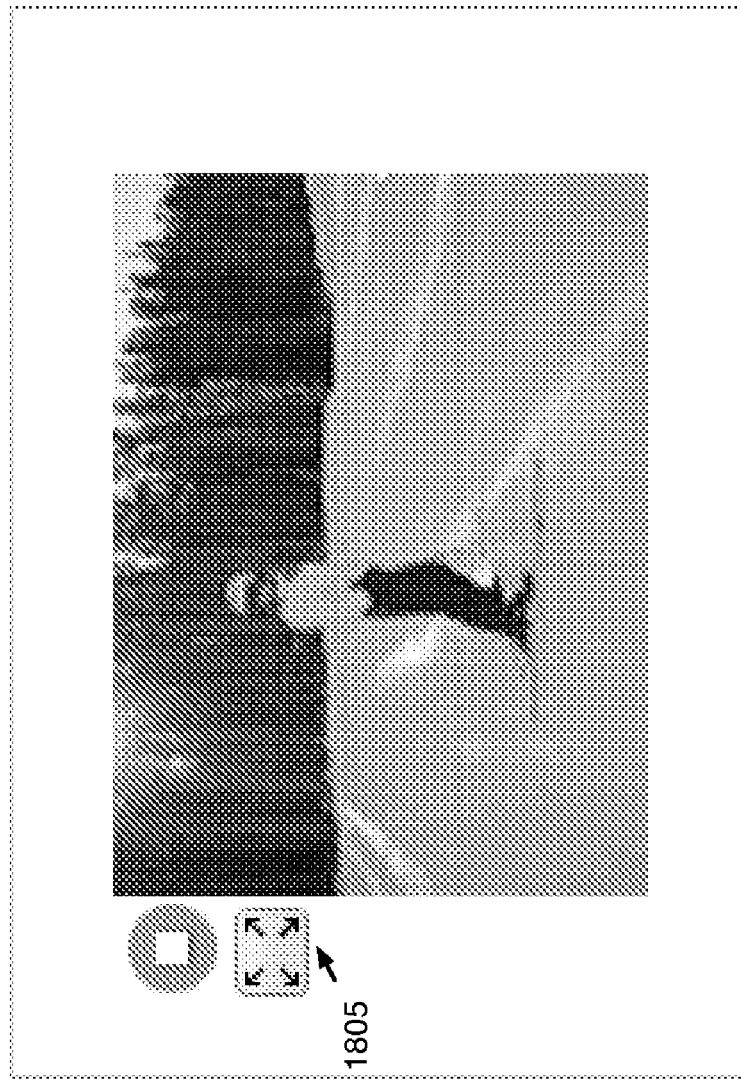
FIG. 18 illustrates an example of a motion picture preview that provides an expansion button for expanding the motion picture preview to cover the entire display screen of some embodiments of the invention.

Other embodiments provide other playback control buttons to facilitate the playing of the motion picture preview. For instance, FIG. 18 illustrates an example that provides an expansion button 1805 for expanding the motion picture preview to cover the entire display screen of the device.

Different embodiments of the invention provide the playback control buttons differently. For instance, when a motion-picture preview icon is not providing a motion-picture preview, some embodiments display a play button on the preview icon adjacent or on top of the graphical component of the icon irrespective of the position of the cursor of the GUI displaying the icon, as illustrated in FIGS. 5, 15, and 16. Alternatively, when the icon is not providing a preview, other embodiments only display its play button when the cursor of the GUI is within a particular distance of the icon.

Also, some embodiments provide the play bar 505, the marker 515 and/or the line bar 1705 during the motion-picture playback only when the cursor is over or near the icon's graphical preview window. This frees up the icon's graphical preview window to show more of the preview. Some embodiments also provide some control buttons on top of the icon's graphical component and other buttons on the side of this component, as illustrated in FIGS. 5, 15, and 16. Other embodiments display all the buttons either on top of or on the side of the graphical component.

FIGS. 5 and 15 illustrate the use of motion-picture preview icons in the nested folder structure of an operating system. These icons can also be used by operating system or applications of the device to display results of searches, etc. For instance, instead of displaying four multi-image icons, the Spotlight search window 825 of FIG. 8 could display four multi-image, motion-picture preview icons.

The motion-picture preview icons of the invention can also be used by the GUIs of application programs to display multi-image content that is being organized, stored and/or edited by the programs. For instance, instead of displaying four multi-image icons, the photo organizing application of FIG. 9 could display four multi-image, motion-picture preview icons. Such a preview might playback a video clip or slide show stored by the photo organizing application, or it can provide a slide show preview for a film roll or photo album stored by the application.

Figure 19:
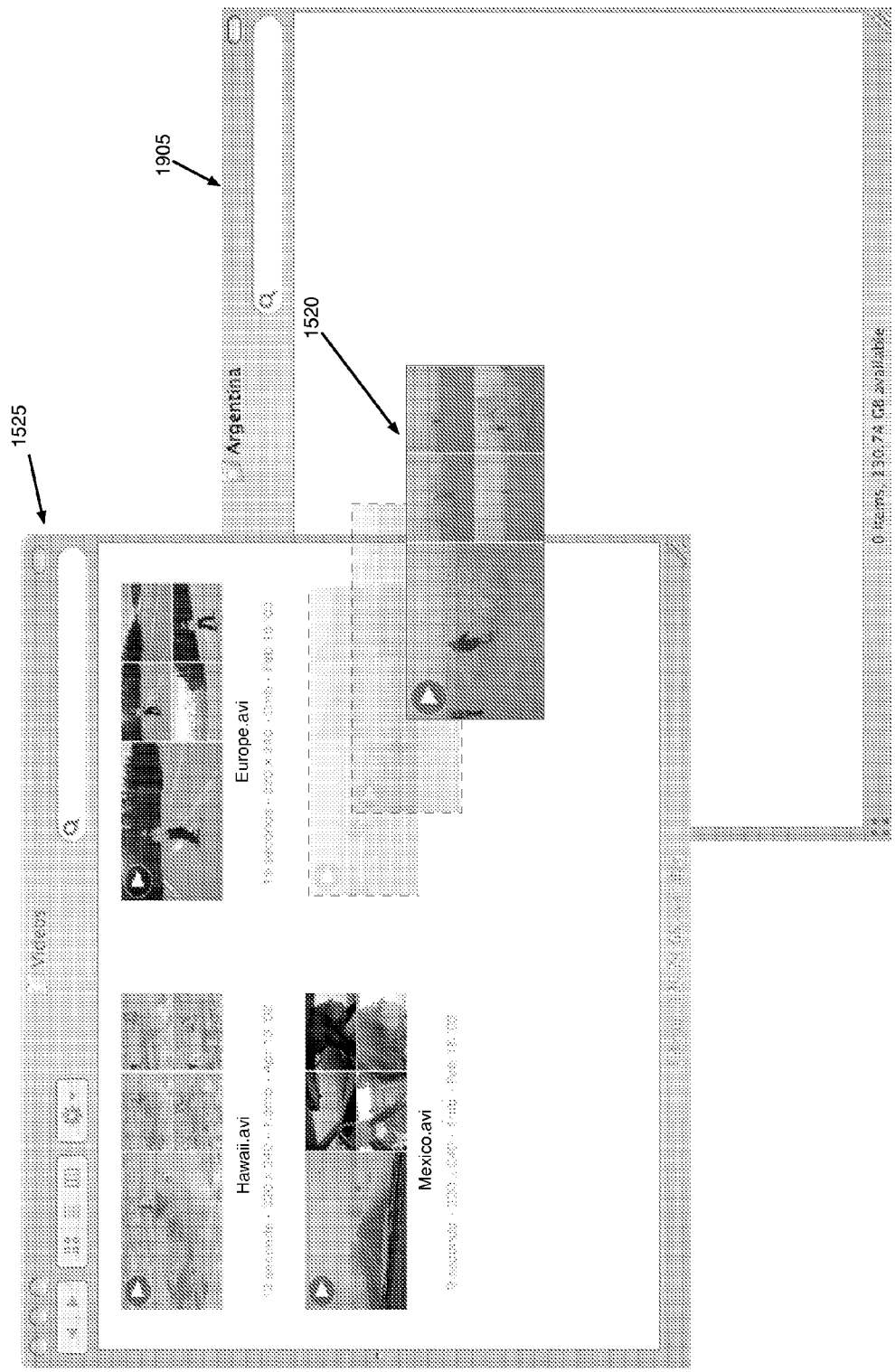
FIGS. 19 and 20 illustrate an example of moving a motion preview icon from one folder to another in some embodiments of the invention.
Figure 20:
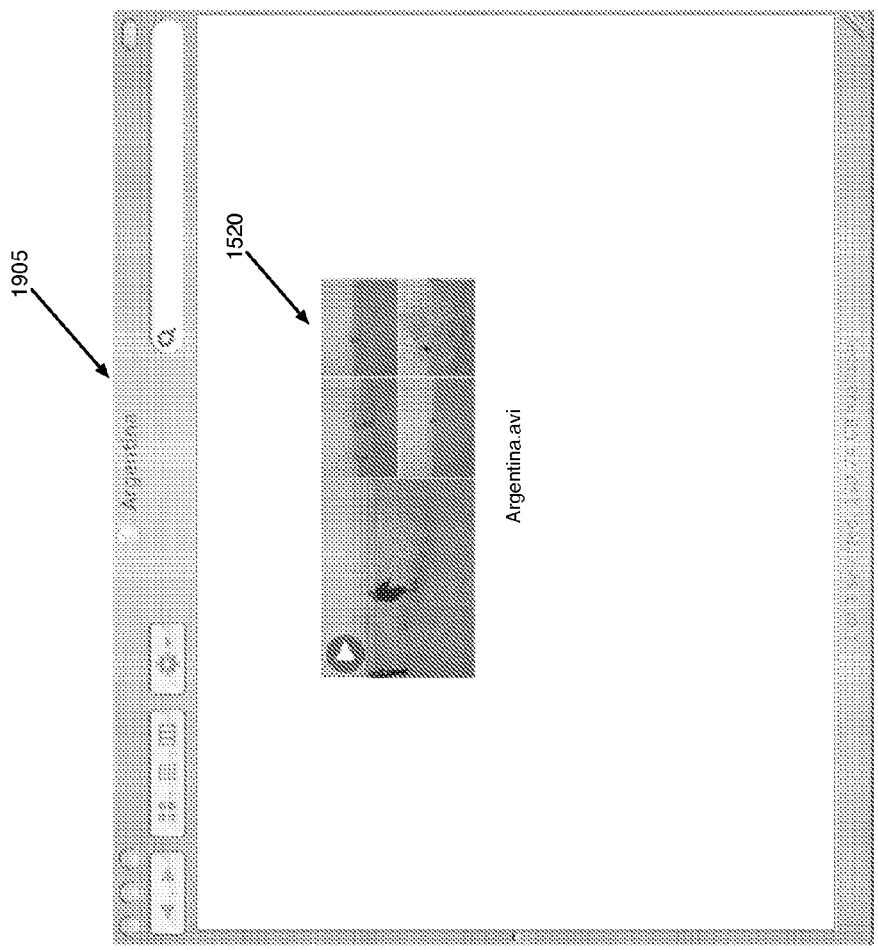

Like the multi-image icons of FIGS. 4, 7, 8, and 9, the motion-picture preview icons of FIGS. 5, 15, and 16 can be selected and moved across (e.g., through click and drag operations) the GUI of the operating system or applications that use these icons. FIGS. 19 and 20 illustrate an example of moving (e.g., through a click and drag operation) the multi-image, motion preview icon 1520 from the folder 1525 to a folder 1905.

Also, such motion-picture preview icons can be used to open the files (e.g., media files) that store their associated data (e.g., media data). For instance, in some embodiments, a user can open the video file associated with a video preview icon by directing the GUI to open this file (e.g., by single or double clicking on the icon). Some embodiments allow a user to open up an icon's file by double clicking on the icon even when the icon is providing a motion picture preview. Other embodiments do not allow this as such a clicking operation might inadvertently affect the preview (e.g., cause the line bar 1705 to move inadvertently). However, even some of these embodiments allow the user to cause the icon's file to open during a motion-picture preview, by using keyboard commands.

Some embodiments terminate the motion-picture preview that a first icon is presenting and have this icon's graphical component animate back to its static multi-image format when the user selects a second icon while the first icon is presenting a motion-picture preview. Some embodiments also terminate the first icon's preview and animate back to this icon's multi-image format when a user inputs a particular command. In some embodiments, this particular command is a stop command, while it is another command in other embodiments as the stop command simply pauses the preview in these embodiments.

Some embodiments also terminate the first icon's preview and animate back to this icon's multi-image format when the preview finishes (e.g., when the video finishes). In other embodiments, once the preview finishes it loops back to its beginning and starts again. Accordingly, in these embodiments, the icon's preview does not terminate and animate back to its multi-image format when the preview finishes.

In some embodiments, the preview provided in an icon's graphical component does not provide the entire set of images (e.g., an entire video clip represented by an icon). For instance, in some embodiments, the icon provides a preview of only a portion of the video clip, or a special preview presentation associated with the video clip.

Figure 21:
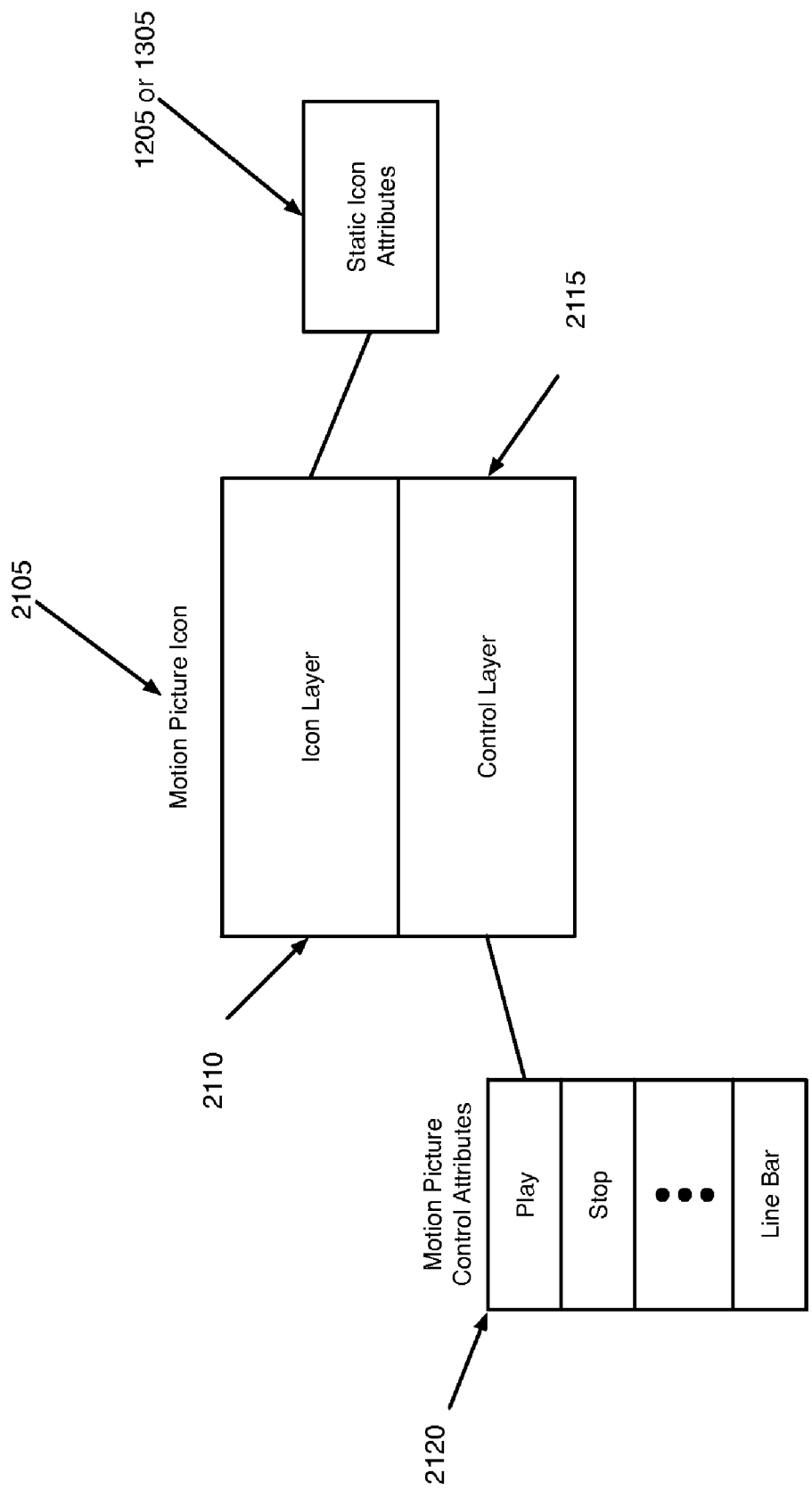
FIG. 21 illustrates a data structure used in some embodiments to represent a multi-image, motion-picture preview icon of some embodiments of the invention.

FIG. 21 conceptually illustrates a data structure 2105 used in some embodiments to represent a multi-image, motion-picture preview icon. As shown in this figure, this data structure 2105 has two layers, an icon layer 2110 and a control layer 2115. The icon layer refers to an icon data structure, such as a data structure 1205 or 1305 illustrated in FIG. 12 or 13. The control layer 2115 refers to a set of control attributes 2120, such as attributes that define the icon's play button, stop button, line bar, etc. In other words, the control layer 2115 defines attributes that are laid over the icon attributes during a motion picture preview within the icon's graphical component. As mentioned above, the parameters about how to animate between the icon's static multi-image preview and dynamic motion-picture preview are set forth in the metadata attributes in the icon data structure 1205 or 1305. These attributes also define the size of the icon's graphical component during the motion-picture preview.

B. Multi-Image Preview Representation

As described above, some embodiments use the multi-image representation of a multi-image content, not in the content's associated icon, but rather in a preview window that opens when a user selects the icon. In some embodiments, the preview window simply shows a static multi-image preview of the selected icon, as illustrated in FIG. 14, which was described above.

Figure 22:
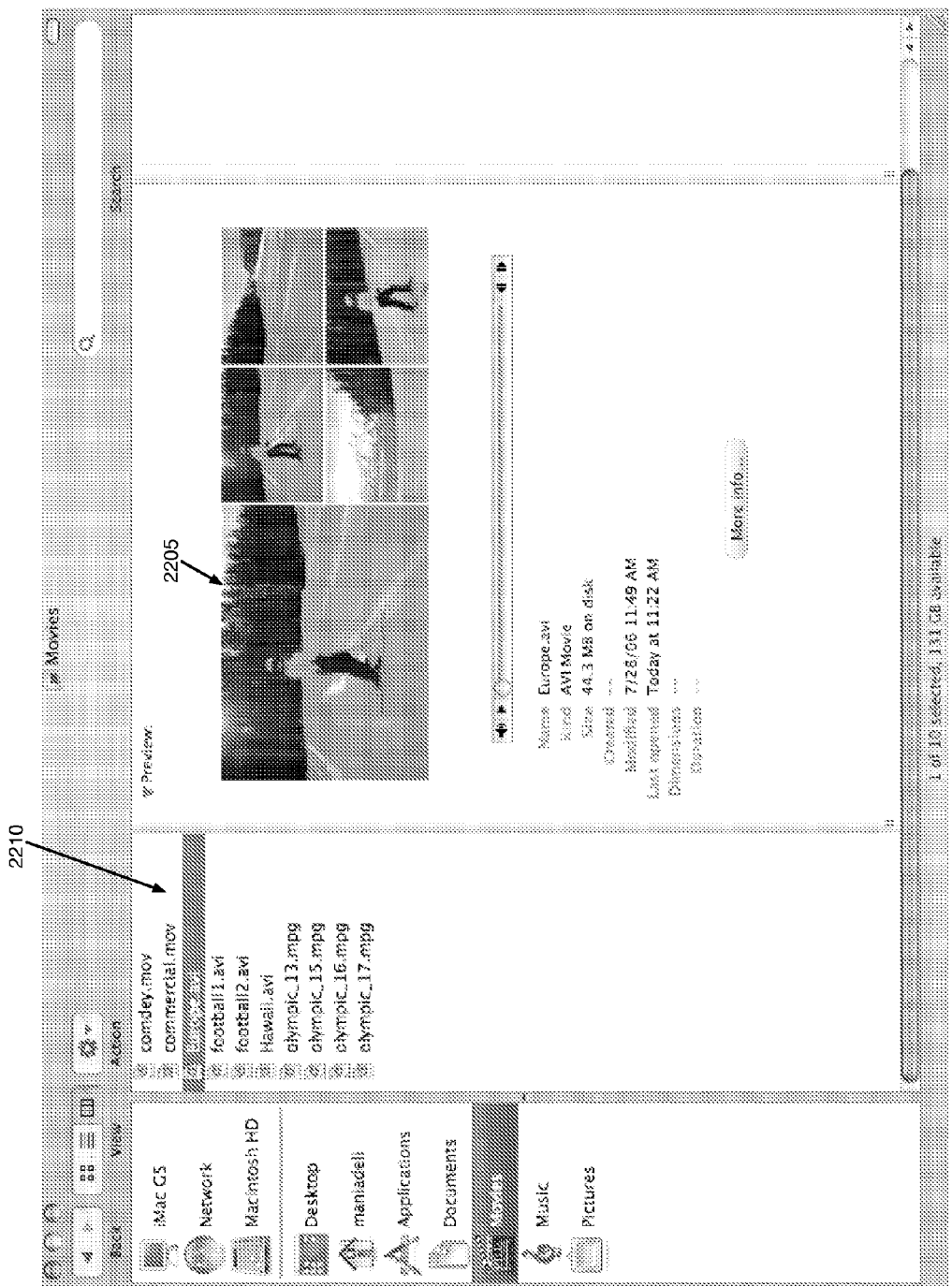
FIG. 22 illustrates a multi-image preview of a video clip after the selection of the clip's associated icon of some embodiments of the invention.
Figure 23:
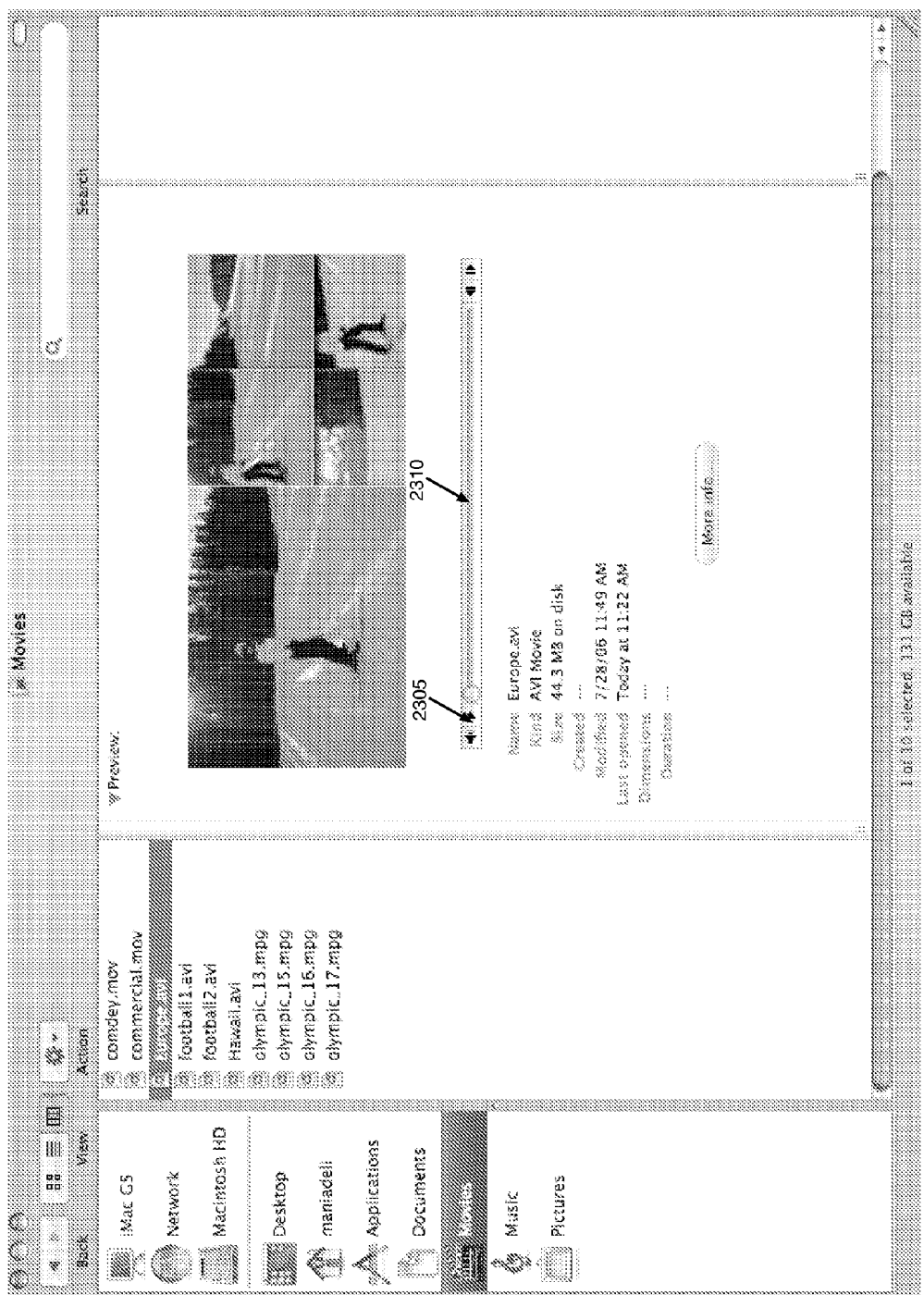
FIGS. 23-25 illustrate a motion picture transformation of a preview after a user selects the play button on the play bar of some embodiments of the invention.
Figure 24:
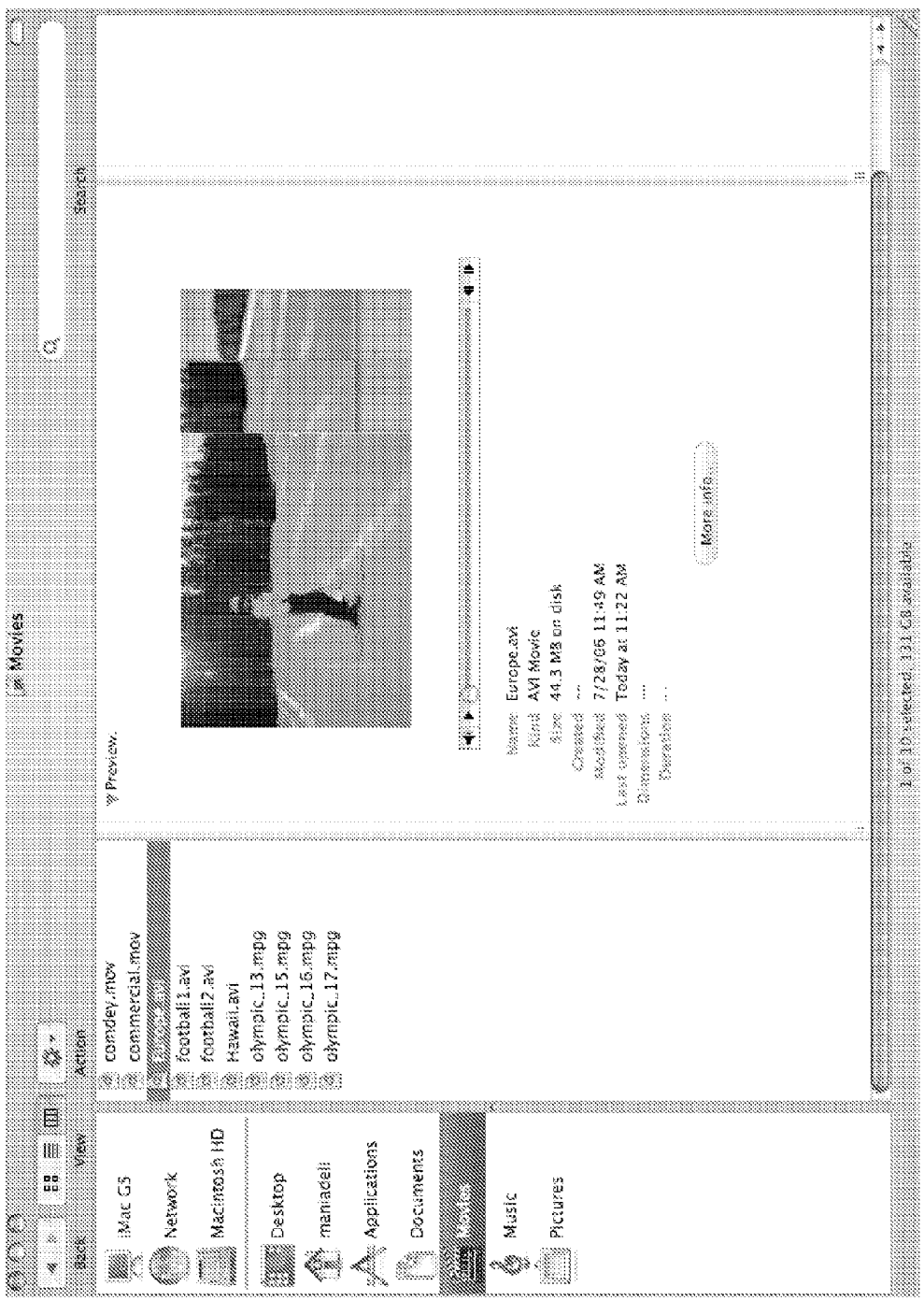
Figure 25:
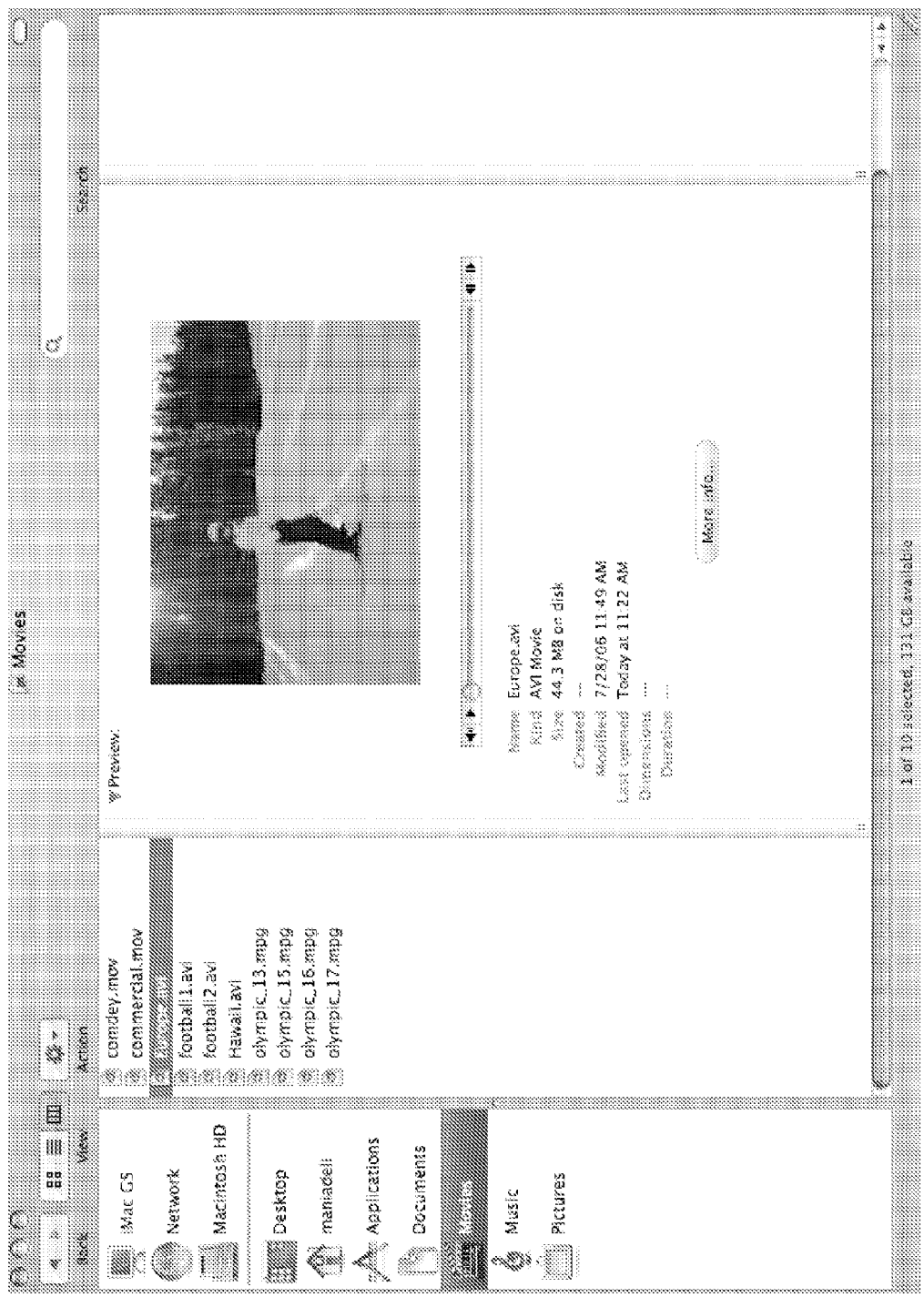
Figure 26:
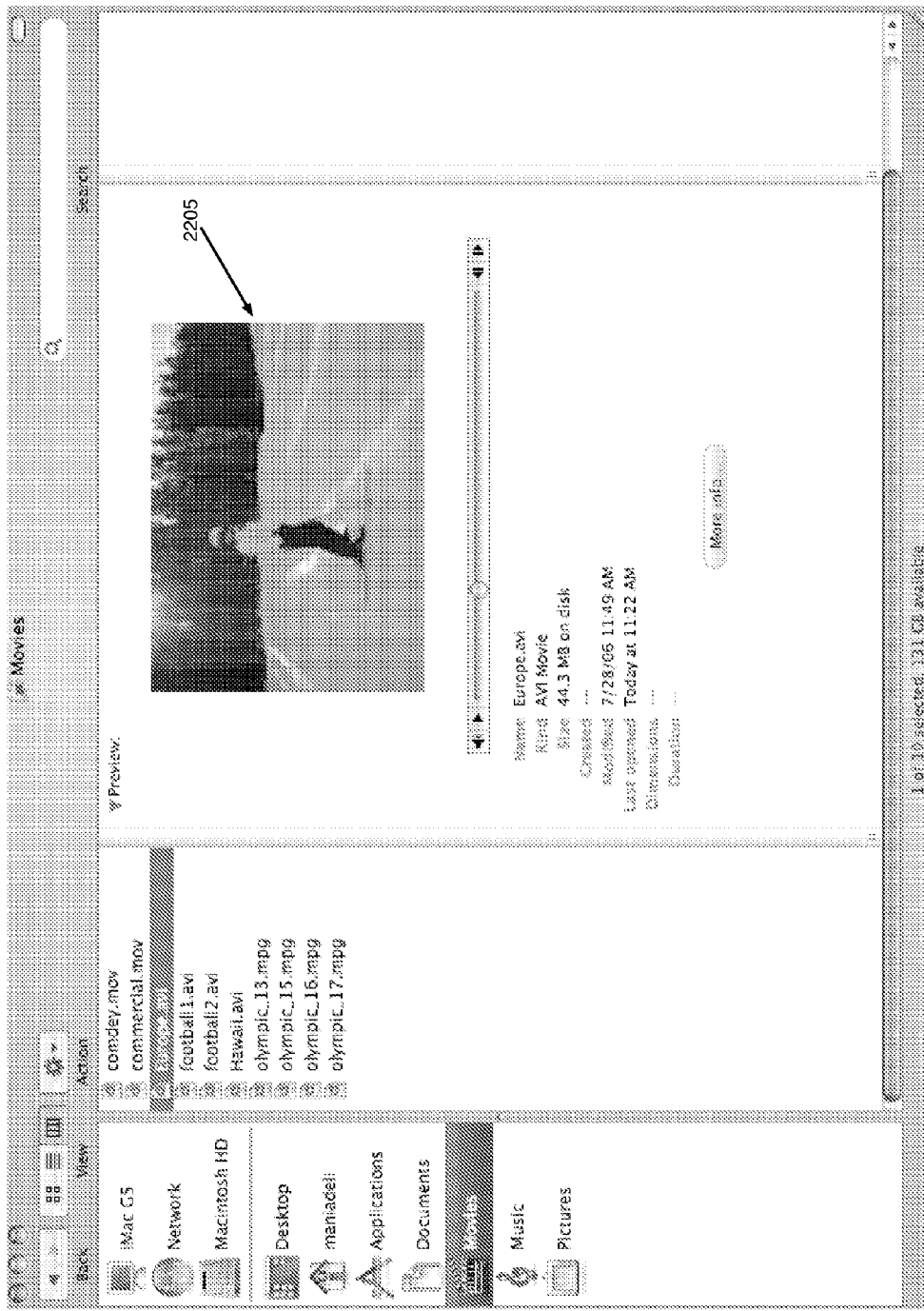
FIG. 26 illustrates the playing of a motion picture preview in an enlarged preview window after only one thumbnails remains in some embodiments of the invention.

However, in other embodiments, the static multi-image representation in the preview window can be transformed to a dynamic motion picture preview upon a user's request. Like the transformation illustrated in FIG. 16, this transformation can be an animated one. FIGS. 22 to 26 illustrate one example of such a transformation. FIG. 22 illustrates a multi-image preview 2205 of a video clip after the selection of the clip's associated icon 2210. FIGS. 23-25 illustrate the motion picture transformation of the preview 2205 after the user selects the play button 2305 on the play bar 2310 at the bottom of the preview 2205. As in the example in FIG. 16, each of the thumbnails gradually increases in size in FIGS. 23-25 until the leftmost thumbnail overlaps all the other thumbnails. Also, the size of the overall preview increases while the size of the thumbnails increase. FIG. 26 illustrates the playing of the motion picture preview in the enlarged preview window 2205 after only one thumbnail remains.

Other embodiments arrange the images differently in the preview window. For instance, some embodiments arrange the images of the graphical preview in one row or in one column. Also, even though FIGS. 22-26 illustrate the multi-image, motion picture preview of some embodiments in the context of the folder structure of an operating system, one of ordinary skill will realize that such a preview can be used in other contexts in the GUI's of the operating system and/or applications of a device.

C. Video Preview, Single Thumbnail Icon

Several embodiments described above implement the motion-picture preview in icons that have a multi-image graphical component. Other embodiments, however, implement the motion-picture preview in the graphical component of an icon that is a single thumbnail graphical component.

Figure 27:
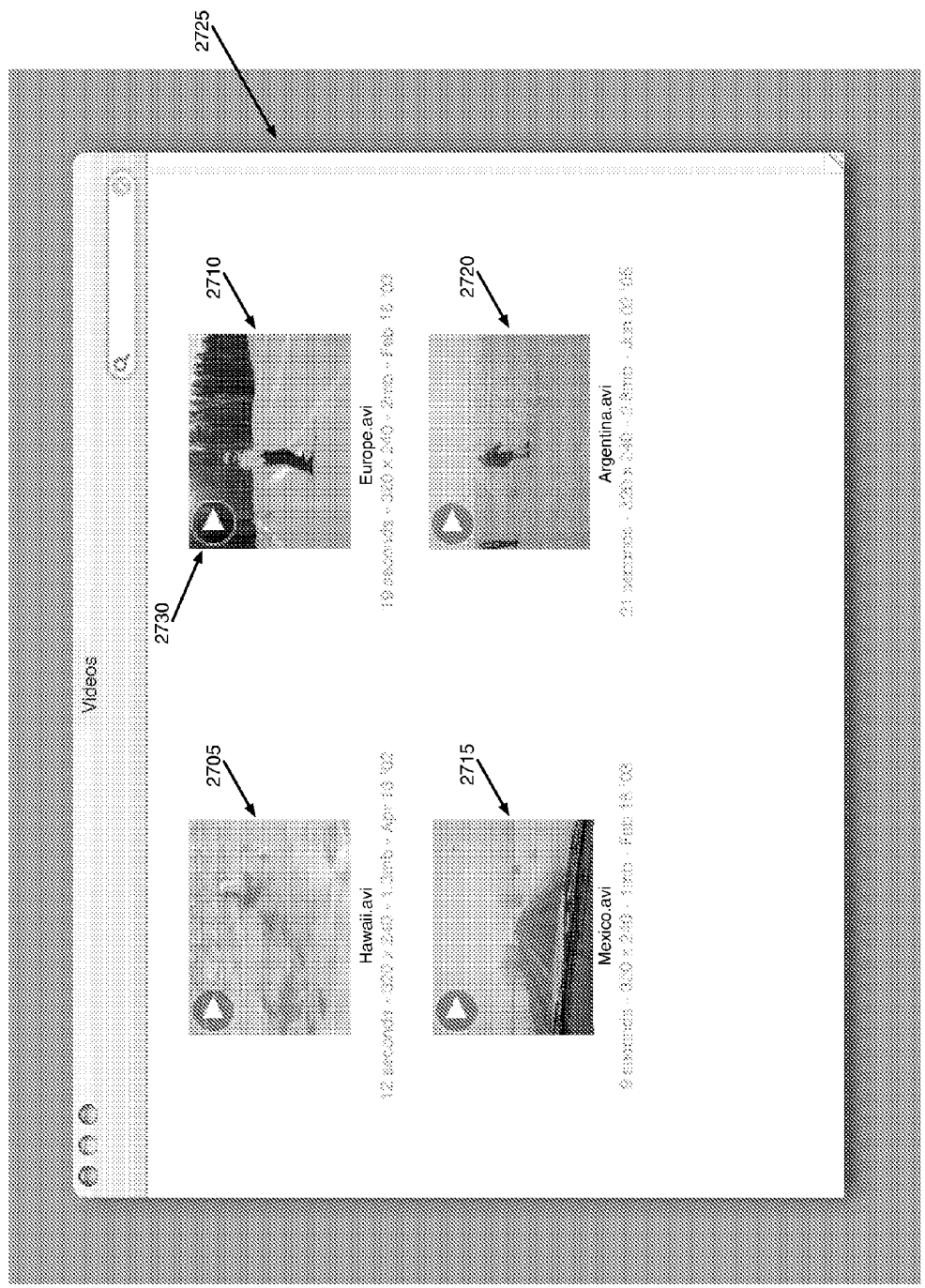
FIG. 27 illustrates an example of a single thumbnail, motion-picture preview icon of some embodiments of the invention.

FIG. 27 illustrates an example of a single thumbnail, motion-picture preview icon. Specifically, it illustrates a video folder 2725 that includes four icons 2705-2720 of four video clips. Each of these icons is a single thumbnail, motion-picture preview icon. Each icon includes a play button 2730. When this button is selected by a user, the motion-picture preview is displayed within the icon's graphical component.

Figure 28:
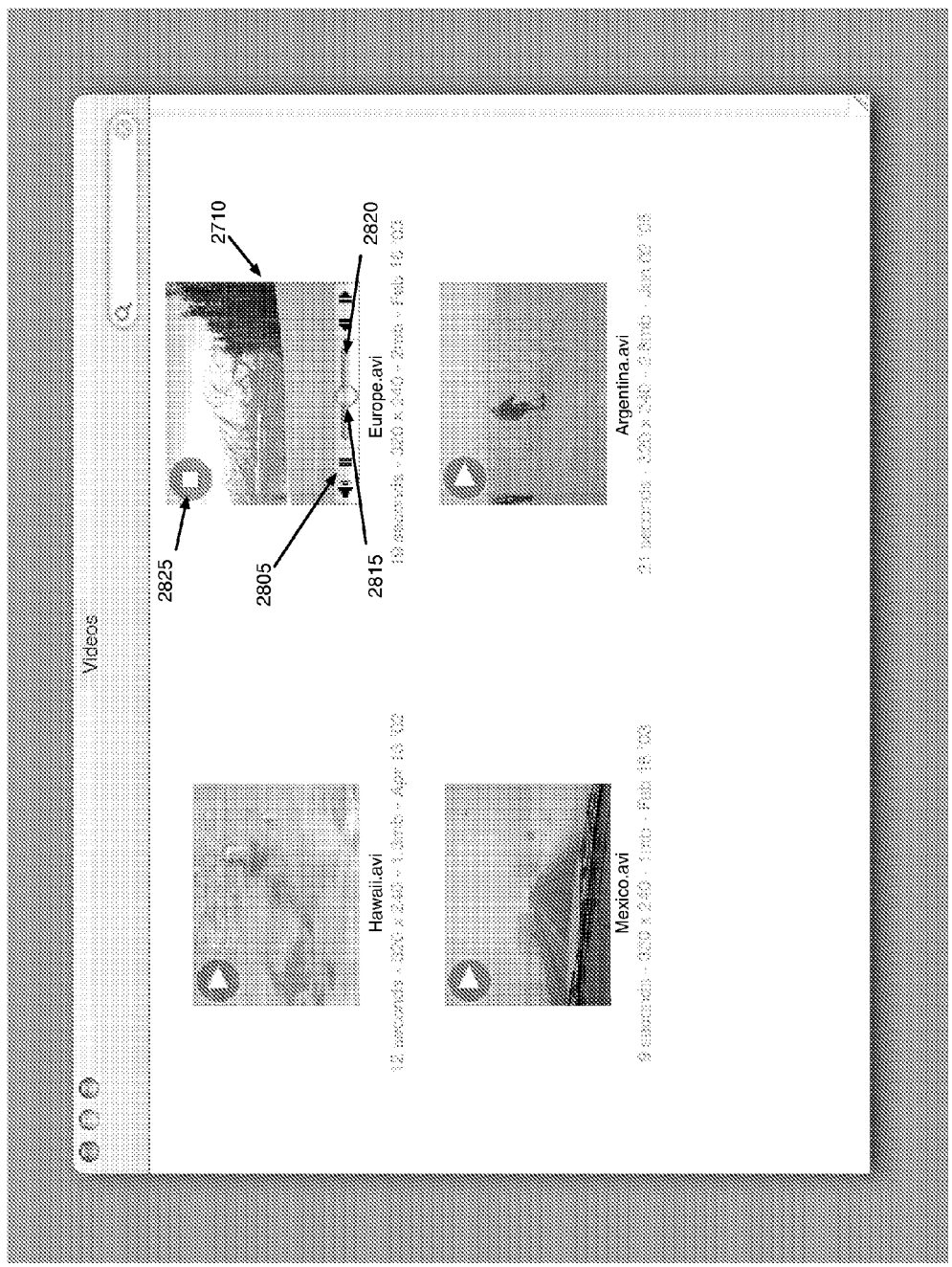
FIG. 28 illustrates the display of the video represented by the icon after a user has requested the playing of this video by selecting the button of some embodiments of the invention.

For instance, FIG. 28 illustrates the display of the video represented by icon 2710, after a user has requested the playing of this video by selecting the button 2730. As shown in this figure, the play button is replaced with a stop button 2825. As further shown in FIG. 28, some embodiments display the playback bar 2820 that includes a scrolling marker 2815 (which at any given time during the playback, identifies the location of the current frame), a pause button 2805, and several other common playback functionalities (like volume control, etc.). In some embodiments, the pause and stop buttons 2805 and 2825 have the same functionality. In other embodiments, the pause button pauses the playback, while the stop button causes the icon to reset (e.g., to go back to the first frame in the single-thumbnail version).

In FIG. 28, the playback bar and some of the control functionalities are different than those shown for the motion-picture preview in FIGS. 5, 17, and 22-26. One of ordinary skill will realize that other embodiments might use the playback bar and control functionalities of these other figures for the icons of FIG. 28. Alternatively, some embodiments might use the playback bar and/or control functionalities illustrated in FIG. 28 in the icons of the other figures.

VI. MULTI-IMAGE PREVIEWS FOR OTHER PRESENTATIONS

Several embodiments of the invention were described above by reference to several examples of video and image presentations. One of ordinary skill will realize that many embodiments are applicable to other types of presentations, such as audio presentations, video presentations, document-based presentations (written documents, written or graphical slide presentations, drawings, etc.).

Figure 29:
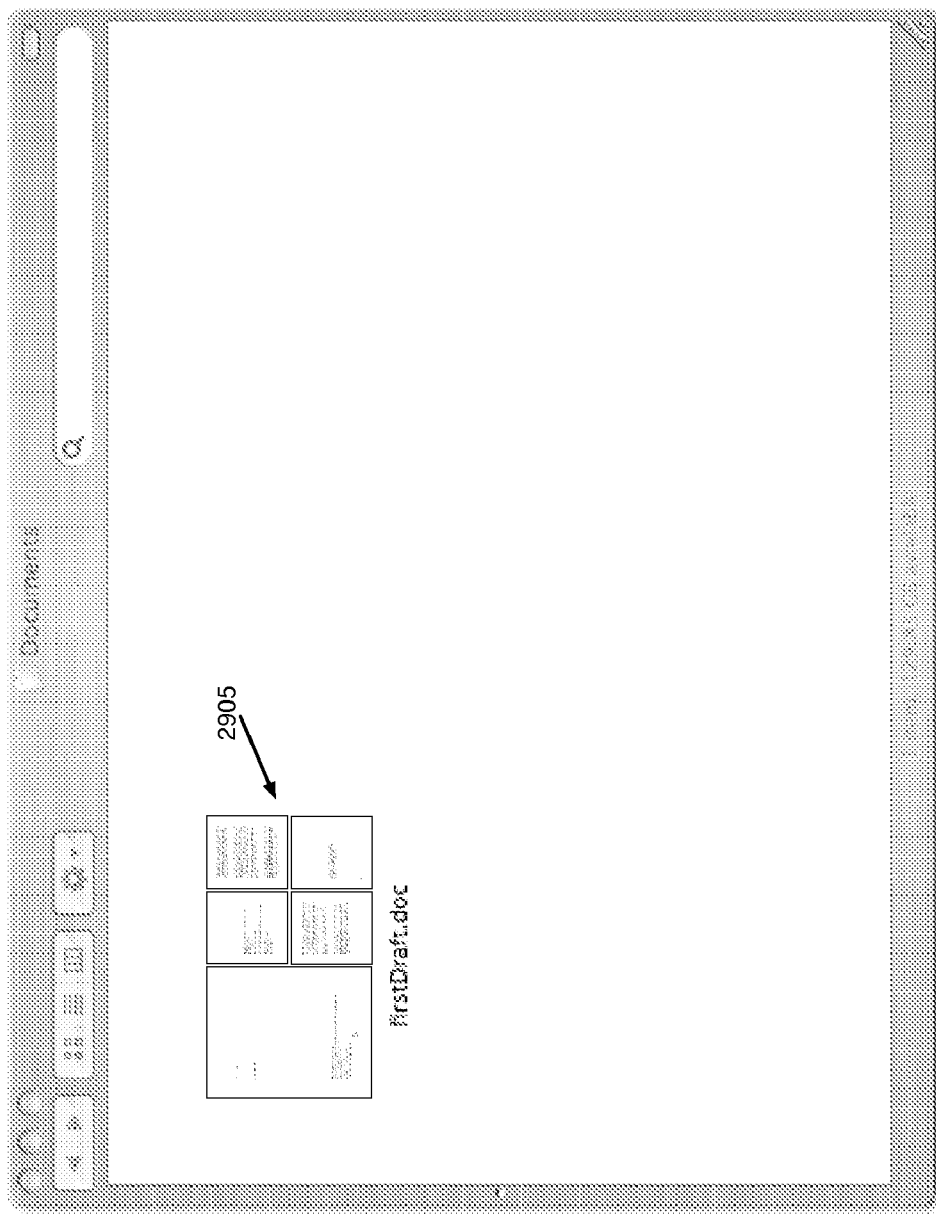
FIG. 29 illustrates an example of using the multi-image preview to create a multi-image preview icon that represents a word processing document in some embodiments of the invention.

For example, FIG. 29 illustrates an example of using the multi-image preview of some embodiments to create a multi-image preview 2905 icon that represents a word processing document. In this example, each of five images in the icon's graphical component is an image of a page of the document. The five images can be part of a single composite thumbnail with five sections each representing a page of the document. Alternatively, each of the five images can be its own separate thumbnail.

The multi-image preview illustrated in FIG. 29 might not be implemented as part of the graphical component of an icon in some embodiments. Instead, it might be used as a simple preview of a document. For instance, some embodiments might open the multi-image preview of FIG. 29 when a user selects the document icon, in much the same way that the preview of a video clip is illustrated in FIG. 14 when a user selects the icon of the video clip.

VII. ICON WITH MULTIPLE ACCESS POINTS

As described above by reference to FIG. 4 and 7, some embodiments have each image in a multi-image icon serve as a link to access its corresponding image in the set of images. Some embodiments can use such multi-image icons even when the content is not a set of images. For instance, in FIG. 29, each image in the multi-image icon 2905 of a document can serve as a link to access its corresponding page in the document. In other words, some embodiments allow a user to have an application (e.g., a word processing application) open a document to a particular page when the user uses the that particular page's image in the icon 2905 to open the document (e.g., when the user double clicks on the particular page's image).

The more general case of a multi-image icon is a multi-access point icon. A multi-access point icon has multiple displayed elements (called access points), where each particular displayed element identifies a corresponding particular section of a presentation (e.g., audio presentation, visual presentation, document presentation, etc.) that has multiple sections. Such an icon is highly beneficial in many settings for allowing a user to start a presentation at a particular section by using the particular section. In other words, a user can have an operating system or application start the presentation at a particular section by using that particular section's displayed element in the icon (e.g., by double clicking on the particular section's displayed element). In some embodiments, the icon stores metadata that identifies the section that corresponds to each of its displayed elements (i.e., to each access point). In this manner, when a user selects an access point of the icon, the operating system or application can identify the section of the presentation that needs to be presented.

VIII. COMPUTER SYSTEMS

Figure 30:
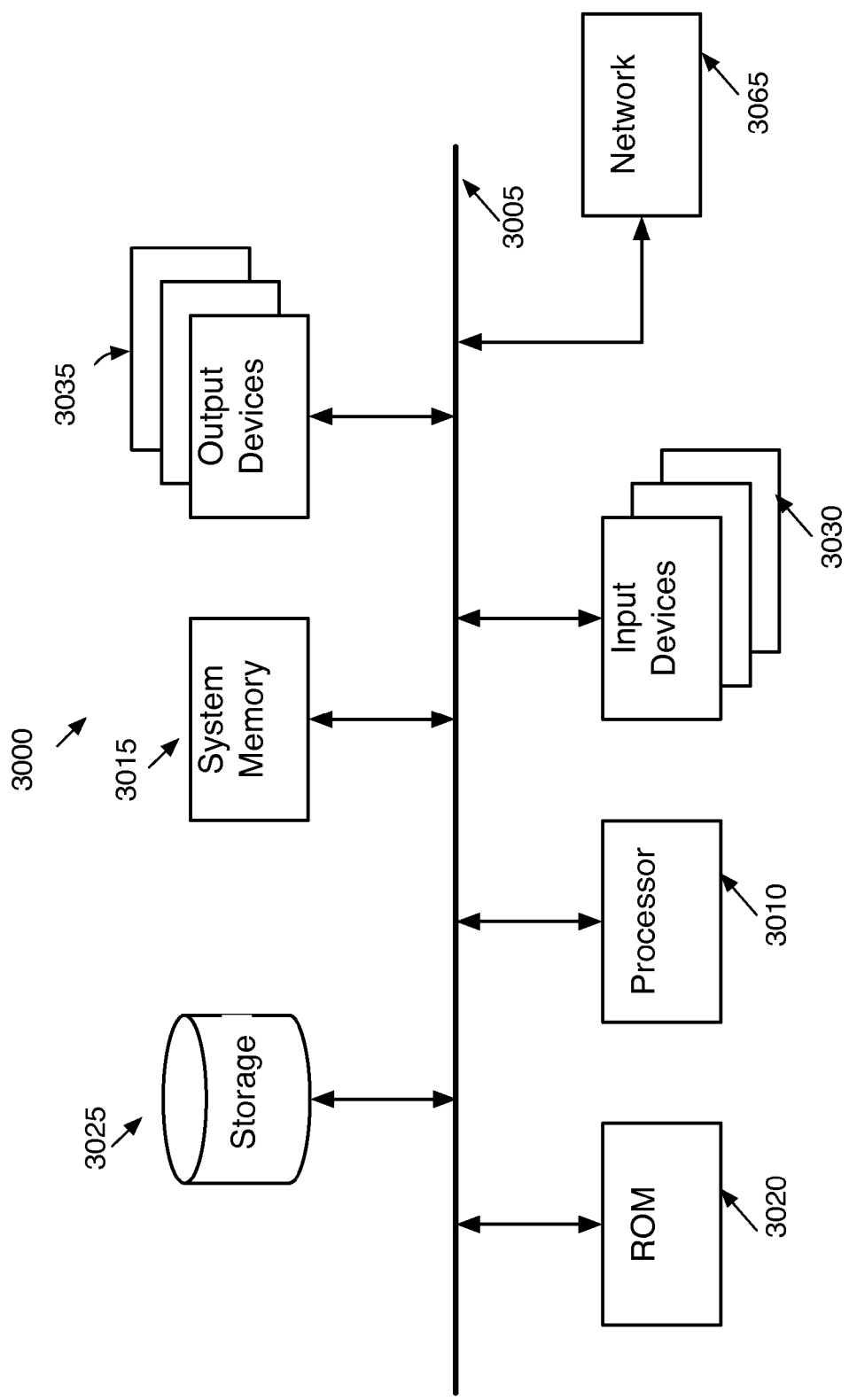
FIG. 30 conceptually illustrates a computer system with which some embodiments of the invention are implemented.

FIG. 30 conceptually illustrates a computer system with which some embodiments of the invention are implemented. This computer system is a standalone computer that implements some embodiments of the invention. In other embodiments, this computer system is embedded in a device that implements some embodiments of the invention.

Computer system 3000 includes a bus 3005, a processor 3010, a system memory 3015, a read-only memory 3020, a permanent storage device 3025, input devices 3030, and output devices 3035. The bus 3005 collectively represents all system, peripheral, and chipset buses that communicatively connect the numerous internal devices of the computer system 3000. For instance, the bus 3005 communicatively connects the processor 3010 with the read-only memory 3020, the system memory 3015, and the permanent storage device 3025.

From these various memory units, the processor 3010 retrieves instructions to execute and data to process in order to execute the processes of the invention. The read-only-memory (ROM) 3020 stores static data and instructions that are needed by the processor 3010 and other modules of the computer system.

The permanent storage device 3025, on the other hand, is a read-and-write memory device. This device is a non-volatile memory unit that stores instruction and data even when the computer system 3000 is off. Some embodiments of the invention use a mass-storage device (such as a magnetic or optical disk and its corresponding disk drive) as the permanent storage device 3025.

Other embodiments use a removable storage device (such as a floppy disk or zip® disk, and its corresponding disk drive) as the permanent storage device. Like the permanent storage device 3025, the system memory 3015 is a read-and-write memory device. However, unlike storage device 3025, the system memory is a volatile read-and-write memory, such as a random access memory. The system memory stores some of the instructions and data that the processor needs at runtime. In some embodiments, the invention's processes (e.g., instructions for generating, displaying, and animating icons and previews, instructions for displaying motion-picture previews, etc.) and icons are stored in the system memory 3015, the permanent storage device 3025, and/or the read-only memory 3020.

The bus 3005 also connects to the input and output devices 3030 and 3035. The input devices enable the user to communicate information and select commands to the computer system. The input devices 3030 include alphanumeric keyboards and cursor-controllers. The output devices 3035 display images generated by the computer system. For instance, these devices display the GUIs described above. The output devices include printers and display devices, such as cathode ray tubes (CRT) or liquid crystal displays (LCD).

Finally, as shown in FIG. 30, bus 3005 also couples computer 3000 to a network 3065 through a network adapter (not shown). In this manner, the computer can be a part of a network of computers (such as a local area network ("LAN"), a wide area network ("WAN"), or an Intranet) or a network of networks (such as the Internet). Any or all of the components of computer system 3000 may be used in conjunction with the invention. However, one of ordinary skill in the art would appreciate that any other system configuration may also be used in conjunction with the present invention.

While the invention has been described with reference to numerous specific details, one of ordinary skill in the art will recognize that the invention can be embodied in other specific forms without departing from the spirit of the invention. For instance, several embodiments were described above by reference to different shapes of thumbnails. Other embodiments might use other thumbnail shapes. Some embodiments might animate the transition from the static multi-image preview to the dynamic motion-picture preview differently, or might start the dynamic motion-picture preview differently. Thus, one of ordinary skill in the art would understand that the invention is not to be limited by the foregoing illustrative details, but rather is to be defined by the appended claims.

What is claimed is:

1. A non-transitory computer readable medium storing (i) an operating system for providing a graphical user interface (GUI) of a device and (ii) a plurality of video clips that each comprises a set of images, the GUI comprising a plurality of folders, the operating system executable by at least one computing resource, the operating system comprising sets of instructions for:
presenting a plurality of icons in the GUI, wherein each icon (i) represents, in the GUI, a corresponding video clip in the plurality of video clips, (ii) comprises a first display area that displays a static thumbnail image, and (iii) is moveable among the plurality of folders of the GUI, wherein a selection of an icon causes the set of images of the icon's corresponding video clip to be played in a second display area that differs from the first display area; and
playing, within the first display area of each icon, a subset of the set of images of the icon's corresponding video clip to provide a preview of said corresponding video clip.

2. The non-transitory computer readable medium of claim 1, wherein each icon further comprises a text component that indicates a filename of the icon's corresponding video clip.

3. The non-transitory computer readable medium of claim 2, wherein the set of instructions for playing the subset of the set of images comprises a set of instructions for starting an application for retrieving said subset of the set of images and for playing said subset of the set of images, without providing a visual indication of the starting of the application.

4. The non-transitory computer readable medium of claim 3, wherein the application is a media player.

5. The non-transitory computer readable medium of claim 1, wherein the first display area comprises a window that plays the subset of the set of images by sequentially displaying the subset of the set of images one image at a time.

6. The non-transitory computer readable medium of claim 1, wherein each icon further comprises a play button that, when selected, causes the subset of the set of images of the icon's corresponding video clip to be played within the first display area.

7. The non-transitory computer readable medium of claim 6, wherein each icon further comprises a stop button that, when selected, stops the playing of the subset of the set of images of the icon's corresponding video clip within the first display area.

8. The non-transitory computer readable medium of claim 7, wherein the play and stop buttons of each icon are presented in the first display area of the icon.

9. The non-transitory computer readable medium of claim 1, wherein the operating system further comprises sets of instructions for:
presenting a play button in the first display area of each icon that, when selected, causes the subset of the set of images of the icon's corresponding video clip to be played within the first display area; and
presenting a stop button in the first display area of each icon that, when selected, stops the playing of the subset of the set of images of the icon's corresponding video clip.

10. The non-transitory computer readable medium of claim 9, wherein the set of instructions for presenting the play button comprises a set of instructions for presenting the play button when a cursor of the GUI is within a particular distance of the icon.

11. The non-transitory computer readable medium of claim 9, wherein the set of instructions for presenting the play button comprises a set of instructions for presenting the play button when the subset of the set of images is not being played within the first display area of the icon.

12. The non-transitory computer readable medium of claim 1, wherein the operating system further comprises a set of instructions for displaying a geometric element that scrolls across the first display area of each icon as the subset of the set of images of the icon's corresponding video clip is played in the first display area, said geometric element for providing an indication of a location of an image within the subset of the set of images that is displayed in the first display area.

13. The non-transitory computer readable medium of claim 12, wherein said geometric element is user selectable for allowing a user to view other images within the subset of the set of images by selecting and moving said geometric element across the first display area.

14. The non-transitory computer readable medium of claim 1, wherein, for a particular icon, said subset of the set of images of the corresponding video clip represented by the particular icon comprises fewer images than the set of images in said corresponding video clip.

15. A non-transitory computer readable medium storing a computer program for providing a preview of a set of images stored on a device in a graphical user interface (GUI) of the device, the computer program comprising sets of instructions for:
presenting an icon that (i) represents the set of images in the GUI and (ii) comprises a graphical component that includes a first display area that provides a static and simultaneous display of a plurality of the images in the set of images, wherein a selection of the icon causes the set of images to be sequentially displayed one image at a time in a second display area that is different than the first display area; and providing, in the first display area, an animated display of a subset of the set of images by (i) transitioning from simultaneously displaying said plurality of the images in the set of images in the first display area to displaying a single image from the plurality of images in the first display area and (ii) after the transitioning, sequentially displaying, starting with said single image, each image in the subset of images one image at a time within said first display area to provide a preview of the set of images.

16. The non-transitory computer readable medium of claim 15, wherein the subset of the set of images comprises fewer images than the set of images.

17. The non-transitory computer readable medium of claim 15, wherein the plurality of the images in the set of images become larger when transitioning from displaying said plurality of the images in the set of images in the first display area to displaying a single image in the first display area.

18. The non-transitory computer readable medium of claim 15, wherein the plurality of the images in the set of images overlap one another when transitioning from displaying said plurality of the images in the set of images in the first display area to displaying the single image in the first display area.

19. The non-transitory computer readable medium of claim 15, wherein the plurality of the images in the set of images swirl in a circle when transitioning from displaying said plurality of the images in the set of images in the first display area to displaying the single image in the first display area.

20. The non-transitory computer readable medium of claim 15, wherein the computer program further comprises a set of instructions for providing an expansion button for expanding the preview of the set of images to cover an entire display screen of the device.

21. The non-transitory computer readable medium of claim 15, wherein the set of instructions for transitioning from simultaneously displaying the plurality of the images to displaying a single image from the plurality of the images in the first display area comprises a set of instructions for enlarging the single image to overlap the remaining images in the plurality of the images.

22. A non-transitory computer readable medium storing a computer program for providing a preview of a video clip in a graphical user interface (GUI) of a device, the video clip comprising a set of images, the GUI comprising a plurality of folders, the computer program comprising sets of instructions for:

presenting a GUI element that (i) represents the video clip in the GUI, (ii) comprises a graphical component for providing a preview of the video clip, and (iii) is moveable between said non-transitoryfolders in the GUI, wherein a selection of the GUI element causes the set of images associated with the video clip to be sequentially displayed in a display area that is separate from the GUI element's graphical component, wherein images from the set of images are not simultaneously displayed during the sequential display of the set of images; and within the graphical component of said GUI element, sequentially displaying a subset of the set of images in order to provide the preview of the video clip, wherein images from the subset are not simultaneously displayed within the graphical component of the GUI element during the preview of the video clip.

23. The non-transitory computer readable medium of claim 22, wherein said GUI element is an icon comprising said graphical component.

24. The non-transitory computer readable medium of claim 22, wherein the set of instructions for displaying the subset of the set of images comprises a set of instructions for starting an application for retrieving said subset of the set of images and for generating the display of said subset of the set of images, without providing a visual indication of the starting of the application.

25. The non-transitory computer readable medium of claim 22, wherein the graphical component includes a window that displays the subset of the set of images one image at a time.

26. The non-transitory computer readable medium of claim 22, wherein the computer program further comprises a set of instructions for presenting a play button to start the display of the subset of the set of images within the graphical component.

27. The non-transitory computer readable medium of claim 26, wherein the computer program further comprises a set of instructions for presenting a stop button to stop the display of the subset of the set of images within the graphical component.

28. The non-transitory computer readable medium of claim 26, wherein the set of instructions for presenting the play button comprises a set of instructions for presenting the play button when a cursor of the GUI is within a particular distance of the GUI element.

29. The non-transitory computer readable medium of claim 26, wherein the set of instructions for presenting the play button comprises a set of instructions for presenting the play button when the subset of the set of images is not being displayed within the graphical component.

30. The non-transitory computer readable medium of claim 22, wherein the graphical component includes a window for displaying the subset of the set of images, the computer program further comprising a set of instructions for displaying a geometric element that scrolls across the window as the subset of the set of images is displayed in the window, said geometric element for providing an indication of a location of an image within the subset of the set of images that is displayed in the window.

31. The non-transitory computer readable medium of claim 30, wherein said geometric element is user selectable for allowing a user to view other images within the subset of the set of images by selecting and moving said geometric element across the window.

32. A device comprising:

a non-transitory computer readable medium storing an operating system and a set of video clips, each video clip comprising a set of images, said operating system comprising a graphical user interface (GUI), said GUI comprising a plurality of icons, wherein each icon (1) represents one of the video clips in the set of video clips and (2) comprises a graphical component that includes a first display area, for each icon, the first display area (a) providing a static and simultaneous display of a plurality of the images in the icon's video clip and (b) providing an animated display of a subset of the set of images by (i) transitioning from simultaneously displaying said plurality of the images in the first display area to displaying a single image in the first display area and (ii) sequentially displaying, within said first display area, each image in the subset of the set of images in order to provide a preview of the set of images, said sequential display starting with said single image, wherein a selection of the icon causes the set of images to be sequentially displayed in a second display area that is different than the first display area.

33. The device of claim 32, wherein said graphical component further comprises a play button for starting the display of a sequence of a plurality of images of a video clip represented by a particular icon within the graphical component of the particular icon.

34. The device of claim 33, wherein said graphical component further comprises a stop button for stopping the display of the sequence of the plurality of the images within the graphical component of said particular icon.

35. The device of claim 34, wherein the play and stop buttons are part of the graphical component of the particular icon.

36. The device of claim 33, wherein the play button is presented when a cursor of said GUI is within a particular distance of the particular icon.

37. The device of claim 34, wherein the play and stop buttons are items in said graphical component that are associated with the particular icon.

38. The device of claim 32, wherein the graphical component further comprises a geometric element for scrolling across the first display area as the subset of images is sequentially displayed in the first display area to provide an indication of a location of an image within the subset of images that is displayed in the first display area.

39. The device of claim 38, wherein said geometric element is user selectable for allowing a user to view other images within the sequence by selecting and moving said geometric element across the first display area.

40. The device of claim 32, wherein each icon is moveable within said GUI.

41. The device of claim 32, wherein said first display area further comprises a selectable play button for providing the preview of the set of images of the icon, wherein the first display area provides the animated display of the subset of the set of images of the icon in response to a selection of the play button.

42. A method of providing previews of video clips in a graphical user interface (GUI) of a device, each of the video clips comprising a set of images, the method comprising:

presenting a plurality of GUI elements, wherein each GUI element (i) represents, in the GUI, a corresponding video clip of said video clips, and (ii) comprises a graphical component that includes a selectable button;

receiving a selection of a particular GUI element;

in response to the received selection of the GUI element, playing the particular GUI element's video clip by sequentially displaying the set of images of the particular GUI element's corresponding video clip one image at a time in a display area separate from the particular GUI element's graphical component;

for the particular GUI element, receiving a selection of the button; and in response to the received selection of the button, playing, within the graphical component of the particular GUI element, a portion of the particular GUI element's corresponding video clip by sequentially displaying a subset of images of the corresponding video clip's set of images one image at a time to provide a preview of the GUI element's corresponding video clip.

43. The method of claim 42, wherein playing the portion of the particular GUI element's corresponding video clip comprises starting a media player for retrieving said subset of images associated with said portion of the corresponding video clip and for playing said subset of images without providing a visual indication of the starting of the media player.

44. The method of claim 42 further comprising presenting the selectable button in the graphical component of the GUI element when the portion of the GUI element's video clip is not being played within the graphical component.

45. The method of claim 42, wherein the graphical component includes a window that plays the portion of the particular GUI element's video clip one image at a time.

46. The method of claim 42 further comprising presenting a stop button in the graphical component for stopping the playing of the portion of the particular GUI element's video clip within the graphical component.

47. The method of claim 42 further comprising presenting the selectable button in the graphical component of the GUI element when a cursor of the GUI is within a particular distance of the GUI element.

* * * * *